United States Patent
Zoll et al.

(10) Patent No.: US 10,997,135 B2
(45) Date of Patent: May 4, 2021

(54) METHOD AND SYSTEM FOR PERFORMING CONTEXT-AWARE PROGNOSES FOR HEALTH ANALYSIS OF MONITORED SYSTEMS

(71) Applicant: Oracle International Corporation, Redwood Shores, CA (US)

(72) Inventors: Michael Zoll, Foster City, CA (US); Yaser I. Suleiman, Santa Clara, CA (US); Subhransu Basu, Fremont, CA (US); Angelo Pruscino, Los Altos, CA (US); Wolfgang Lohwasser, Munich (DE); Wataru Miyoshi, Redwood City, CA (US); Thomas Breidt, Munich (DE); Thomas Herter, Santa Clara, CA (US); Klaus Thielen, Munich (DE); Sahil Kumar, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/707,536

(22) Filed: Sep. 18, 2017

(65) Prior Publication Data

US 2018/0083833 A1 Mar. 22, 2018

Related U.S. Application Data

(60) Provisional application No. 62/395,845, filed on Sep. 16, 2016.

(51) Int. Cl.
*H04L 12/24* (2006.01)
*G06F 16/215* (2019.01)
(Continued)

(52) U.S. Cl.
CPC ........ *G06F 16/215* (2019.01); *G06F 11/3409* (2013.01); *G06F 11/3452* (2013.01);
(Continued)

(58) Field of Classification Search
CPC ............. G06F 11/3409; G06F 11/3452; G06F 16/215; G06F 11/0751; G06F 11/079;
(Continued)

(56) References Cited

U.S. PATENT DOCUMENTS 5,408,406 A 4/1995 Mathur et al.
5,477,449 A 12/1995 Lino
(Continued)

FOREIGN PATENT DOCUMENTS

EP 1717736 A2 11/2006
WO WO 2004/053659 A2 6/2004
WO WO 2016/086138 A1 6/2016

OTHER PUBLICATIONS

Collins, et al. "External validation of multivariable prediction models: a systematic review of methodological conduct and reporting", BMC Medical Research Methodology, Mar. 2014.
(Continued)

*Primary Examiner* — Le H Luu
(74) *Attorney, Agent, or Firm* — Vista IP Law Group, LLP

(57) ABSTRACT

Described is an approach for performing context-aware prognoses in machine learning systems. The approach harnesses streams of detailed data collected from a monitored target to create a context, in parallel to ongoing model operations, for the model outcomes. The context is then probed to identify the particular elements associated with the model findings.

24 Claims, 11 Drawing Sheets

(51) Int. Cl.
*G06K 9/62* (2006.01)
*G06F 11/34* (2006.01)
*G06N 20/20* (2019.01)
*G06N 7/00* (2006.01)
G06N 20/00 (2019.01)
H04L 12/26 (2006.01)

(52) U.S. Cl.
CPC ........... *G06K 9/6256* (2013.01); *G06N 7/005* (2013.01); *G06N 20/20* (2019.01); *H04L 41/069* (2013.01); *H04L 41/142* (2013.01); G06N 20/00 (2019.01); H04L 41/0695 (2013.01); H04L 41/0823 (2013.01); H04L 43/02 (2013.01)

(58) Field of Classification Search
CPC ...... G06F 8/654; G06K 9/6256; G06N 7/005; G06N 20/00; G06N 20/20; H04L 41/069; H04L 41/0695; H04L 41/0823; H04L 41/142; H04L 43/02; H04L 41/0677; G05B 23/0256; G06Q 10/06; G06Q 10/10; G06Q 10/20; G08B 21/187
See application file for complete search history.

(56) References Cited

U.S. PATENT DOCUMENTS

| | | | |
|---|---|---|---|
| 6,144,952 | A | 11/2000 | Keeler et al. |
| 6,314,414 | B1 | 11/2001 | Keeler et al. |
| 7,006,900 | B2 | 2/2006 | Zhenduo et al. |
| 7,333,917 | B2 | 2/2008 | Greis et al. |
| 7,346,471 | B2 | 3/2008 | Chickering et al. |
| 7,379,846 | B1 | 5/2008 | Williams et al. |
| 7,457,763 | B1* | 11/2008 | Garrow ............... G06Q 10/06 705/7.24 |
| 7,599,893 | B2 | 10/2009 | Sapir et al. |
| 7,690,037 | B1 | 3/2010 | Hartmann |
| 7,702,598 | B2 | 4/2010 | Saidi et al. |
| 7,725,300 | B2 | 5/2010 | Pinto et al. |
| 7,730,003 | B2 | 6/2010 | Pinto et al. |
| 7,801,839 | B2 | 9/2010 | Kates et al. |
| 7,882,394 | B2 | 2/2011 | Hosek et al. |
| 8,001,527 | B1* | 8/2011 | Qureshi ............... G06F 11/079 717/120 |
| 8,140,421 | B1 | 3/2012 | Humphries et al. |
| 8,195,582 | B2 | 6/2012 | Niemasik et al. |
| 8,214,308 | B2 | 7/2012 | Chu |
| 8,244,654 | B1 | 8/2012 | Hobgood et al. |
| 8,364,613 | B1 | 1/2013 | Lin et al. |
| 8,370,280 | B1 | 2/2013 | Lin et al. |
| 8,374,974 | B2 | 2/2013 | Chen et al. |
| 8,655,698 | B2* | 2/2014 | West, II ............... G06Q 10/06 705/7.12 |
| 8,706,659 | B1 | 4/2014 | Mann et al. |
| 8,712,929 | B1 | 4/2014 | Bickford et al. |
| 8,732,222 | B2 | 5/2014 | Horvitz et al. |
| 8,843,423 | B2 | 9/2014 | Chu et al. |
| 8,843,427 | B1 | 9/2014 | Lin et al. |
| 9,141,911 | B2 | 9/2015 | Zhao et al. |
| 2,397,986 | A1 | 1/2016 | Lin et al. |
| 9,229,838 | B2 | 1/2016 | Chang et al. |
| 9,262,493 | B1 | 2/2016 | Dietrich |
| 9,285,504 | B2 | 3/2016 | Dannevik et al. |
| 9,349,103 | B2 | 5/2016 | Eberhardt et al. |
| 9,349,105 | B2 | 5/2016 | Beymer et al. |
| 9,419,917 | B2 | 8/2016 | Eaton et al. |
| 9,443,194 | B2 | 9/2016 | Chu et al. |
| 9,467,355 | B2 | 10/2016 | Doering et al. |
| 9,489,630 | B2 | 11/2016 | Achin et al. |
| 9,501,541 | B2 | 11/2016 | Doering et al. |
| 9,536,052 | B2 | 1/2017 | Amarasingham et al. |
| 9,542,400 | B2 | 1/2017 | Doering et al. |
| 9,605,704 | B1 | 3/2017 | Humphries et al. |
| 9,619,540 | B2 | 4/2017 | Prathipati et al. |
| 9,621,435 | B2 | 4/2017 | Vasudevan et al. |
| 9,652,714 | B2 | 5/2017 | Achin et al. |
| 9,659,254 | B2 | 5/2017 | Achin et al. |
| 9,667,470 | B2 | 5/2017 | Prathipati et al. |
| 9,717,439 | B2 | 8/2017 | Giftakis |
| 9,838,370 | B2 | 12/2017 | Doering et al. |
| 10,409,817 | B1 | 9/2019 | Dias et al. |
| 2003/0110007 | A1 | 6/2003 | McGee |
| 2003/0139908 | A1 | 7/2003 | Wegerich et al. |
| 2004/0167765 | A1 | 8/2004 | Ata |
| 2005/0134284 | A1* | 6/2005 | Hoff ............... G05B 23/0256 324/511 |
| 2005/0234688 | A1 | 10/2005 | Pinto |
| 2006/0058898 | A1 | 3/2006 | Emigholz et al. |
| 2006/0059253 | A1* | 3/2006 | Goodman ............. G06Q 10/10 709/223 |
| 2006/0064415 | A1 | 3/2006 | Guyon et al. |
| 2006/0173663 | A1 | 8/2006 | Langheier et al. |
| 2006/0247798 | A1 | 11/2006 | Subbu et al. |
| 2006/0248031 | A1 | 11/2006 | Kates et al. |
| 2008/0097637 | A1 | 4/2008 | Nguyen et al. |
| 2008/0281557 | A1 | 11/2008 | Emigholz |
| 2009/0055139 | A1 | 2/2009 | Agarwal |
| 2009/0216393 | A1 | 8/2009 | Schimert |
| 2010/0063948 | A1 | 3/2010 | Virkar et al. |
| 2010/0070343 | A1 | 3/2010 | Taira et al. |
| 2012/0051228 | A1* | 3/2012 | Shuman ............. H04L 41/0677 370/242 |
| 2012/0136896 | A1 | 5/2012 | Tseng |
| 2012/0215664 | A1 | 8/2012 | Dalal et al. |
| 2013/0036082 | A1 | 2/2013 | Natarajan et al. |
| 2013/0226842 | A1 | 8/2013 | Chu |
| 2013/0303391 | A1 | 11/2013 | Li et al. |
| 2014/0058763 | A1 | 2/2014 | Zizzamia et al. |
| 2014/0046879 | A1 | 3/2014 | MacLennan et al. |
| 2014/0114746 | A1 | 4/2014 | Pani et al. |
| 2014/0172371 | A1 | 6/2014 | Zhu et al. |
| 2014/0207493 | A1 | 7/2014 | Sarrafzadeh |
| 2014/0222736 | A1 | 8/2014 | Drew |
| 2014/0258187 | A1 | 9/2014 | Suleiman et al. |
| 2014/0281739 | A1 | 9/2014 | Tuffs et al. |
| 2014/0316220 | A1 | 10/2014 | Sheldon |
| 2014/0343955 | A1 | 11/2014 | Raman |
| 2014/0344186 | A1 | 11/2014 | Nadler |
| 2014/0344195 | A1 | 11/2014 | Drew et al. |
| 2014/0344208 | A1 | 11/2014 | Ghasemzadeh et al. |
| 2014/0372346 | A1 | 12/2014 | Phillipps et al. |
| 2014/0379310 | A1 | 12/2014 | Ramachandran et al. |
| 2015/0067411 | A1 | 3/2015 | Xia |
| 2016/0028599 | A1 | 1/2016 | Vasseur et al. |
| 2016/0092557 | A1 | 3/2016 | Stojanovic et al. |
| 2016/0103838 | A1 | 4/2016 | Sainani et al. |
| 2016/0215996 | A1* | 7/2016 | Blair ................ G08B 21/187 |
| 2016/0267077 | A1 | 9/2016 | Bahgat et al. |
| 2016/0294614 | A1* | 10/2016 | Searle .................. G06F 8/654 |
| 2016/0328406 | A1 | 11/2016 | Convertino et al. |
| 2016/0335550 | A1 | 11/2016 | Achin et al. |
| 2016/0359680 | A1 | 12/2016 | Parandehgheibi et al. |
| 2016/0371601 | A1 | 12/2016 | Grove et al. |
| 2017/0026312 | A1 | 1/2017 | Hrischuk et al. |
| 2017/0102982 | A1* | 4/2017 | Kolandavelu ....... G06F 11/0751 |
| 2017/0169468 | A1 | 6/2017 | Shuken et al. |
| 2017/0186249 | A1* | 6/2017 | Bandy .................. G06Q 10/20 |
| 2017/0220407 | A1 | 8/2017 | Estrada et al. |
| 2017/0245806 | A1 | 8/2017 | Elhawary et al. |
| 2017/0262596 | A1 | 9/2017 | Sengupta |
| 2017/0316586 | A1 | 11/2017 | Ricci |
| 2017/0353477 | A1 | 12/2017 | Faigon et al. |
| 2018/0052903 | A1 | 2/2018 | Mercado et al. |
| 2018/0068033 | A1 | 3/2018 | Bandyopadhyay |
| 2018/0075175 | A1 | 3/2018 | Chang et al. |

OTHER PUBLICATIONS

Razzaghi, et al. "Multilevel Weighted Support Vector Machine for Classification on Healthcare Data with Missing Values", PLoS One, May 2016.

(56) References Cited

OTHER PUBLICATIONS

Lakshminarayan, et al. "Imputation of missing data using machine learning techniques" KDD'96 Proceedings of the Second International Conference on Knowledge Discovery and Data Mining, Aug. 1996, pp. 140-145.
Somasundaram, et al. "Radial Basis Function Network Dependent Exclusive Mutual Interpolation for Missing Value Imputation", Journal of Computer Science, Sep. 2013.
Zhang, et al. "How to evaluate model performance in Azure Machine Learning Studio", Microsoft Azure, Mar. 2017.
Kadane, et al. "Methods and Criteria for Model Selection", Journal of the American Statistical Association, vol. 99, 2004, p. 279-290.
Banaee, et al. "Data Mining for Wearable Sensors in Health Monitoring Systems: a Review of Recent Trends and Challenges" Sensors (Basel), Dec. 2013, pp. 17472-17500.
Ghanbari, et al. "Semantic-Driven Model Composition for Accurate Anomaly Diagnosis", Jun. 2008, IEEE, International Conference on Autonomic Computing.
Chen, et al. "Analysis of service diagnosis improvement through increased monitoring granularity" Springer US, Software Qual J, Jun. 2017.
ServiceNow Inc., "Get to the Root of Your Business Service Quality Issues", 2015.
Dynatrace, "Root cause analysis of infrastructure issues", Retrieved on Feb. 2017 from https://help.dynatrace.com/monitorcloudvirtualizationandhosts/hosts/rootcauseanalysisofinfrastructureissues/.
Wagner, et al. "Measurement Adherence in the Blood Pressure Self-Measurement Room", Telemed J E Health, Nov. 2013, pp. 826-833.
Bala Deshpande "Why predictive maintenance is more relevant today than ever before", Soliton Technologies, Jan. 2014.
Sengupta "Predictive Modeling: 'Ensemble of Ensemble'" Analytics Magazine, Nov./Dec. 2015.
"What is the proper name of a model that takes as input the output of another model?" Jan. 2015, from http://stats.stackexchange.com/questions/135427/what-is-the-proper-name-of-a-model-that-takes-as-input-the-output-of-another-mod.
Cherkassky, et al. "Multiple Model Estimation: A New Formulation for Predictive Learning" submitted to IEE Transaction on Neural Network, 2002.
Meng, et al. "Predictive Modeling Using SAS Visual Statistics: Beyond the Prediction" SAS Institute Inc., Sesug Proceedings 2015.
Tong, et al. "Decision Forest: Combining the Predictions of Multiple Independent Decision Tree Models" J. Chem. Inf. Comput. Sci., Feb. 2003, 43, pp. 525-531.
Yi, et al. "Predictive model performance: offline and online evaluations", ACM SIGKDD Conference, Aug. 2013, pp. 1294-1302.
J. Li, et al. "Machine learning based online performance prediction for runtime parallelization and task scheduling," 2009 IEEE International Symposium on Performance Analysis of Systems and Software, Boston, MA, pp. 89-100.

MicroStrategy Inc. "Inputs for predictive metrics", Advanced Reporting Guide: Enhancing Your Business Intelligence Application, 2013, pp. 782-791.
Subramanian, et al. "Differentially Sampled Anomaly Detection System based on Outlier Identification Technique" Nov. 2015, Indian Journal of Science and Technology, vol. 8(32).
Radoux, et al. "Automated Training Sample Extraction for Global Land Cover Mapping" Remote Sens. May 2014, pp. 3965-3987.
Stang, et al. "The Effect of Data Quality on Data Mining—Improving Prediction Accuracy by Generic Data Cleansing", In International Conference on Information Quality ICIQ, Jan. 2010.
Dienst, et al. "Automatic Anomaly Detection in Offshore Wind SCADA Data", Conference: Wind Europe Summit, Sep. 2016.
Munirathinam, et al. "Predictive Models for Equipment Fault Detection in the Semiconductor Manufacturing Process" IACSIT International Journal of Engineering and Technology, Aug. 2016, vol. 8, No. 4.
Notice of Allowance and Fee(s) dated May 1, 2019 for related U.S. Appl. No. 15/717,500.
Cox, Brenda G., et al. "Business Survey Methods". Wiley, Feb. 16, 1995.
Purwar, et al. "Hybrid prediction model with missing value imputation for medical data" Aug. 2015. Published in Journal Expert Systems with Applications: An International Journal, vol. 42 Issue 13, pp. 5621-5631.
Non-Final Office Action dated Nov. 15, 2019 for related U.S. Appl. No. 15/707,417.
Final Office Action dated Apr. 20, 2020 for related U.S. Appl. No. 15/707,417.
Non-Final Office Action dated May 15, 2020 for related U.S. Appl. No. 15/707,454.
Non-Final Office Action dated Apr. 16, 2020 for related U.S. Appl. No. 16/564,910.
Cox et al. Book entitled "Business Survey Methods", dated Sep. 20, 2011.
Nartgun et al., Article entitled "Comparison of the Various Methods Used in Solving Missing Data Problems", dated Apr. 2016.
Olinsky et al., Article entitled "The comparative efficacy of imputation methods for missing data in structural equation modeling", dated May 20, 2002.
Final Office Action dated Jul. 27, 2020 for related U.S. Appl. No. 16/564,910.
Newgard et al., "Missing Data: What are You Missing?", Society for Academic Emergency Medicine Annual Meeting, (May 2006).
Aittokallio, "Dealing with Missing Values in Large-Scale Studies: Microarray Data Imputation and Beyond", Briefings in Bioinformatics. vol. II, No. 2, (Dec. 2009).
Notice of Allowance dated Sep. 16, 2020 for related U.S. Appl. No. 15/707,417.
Non-Final Office Action dated Mar. 4, 2021 for related U.S. Appl. No. 15/707,454.
Non-Final Office Action dated Mar. 18, 2021 for related U.S. Appl. No. 16/564,910.
Final Office Action dated Nov. 13, 2020 for related U.S. Appl. No. 15/707,454.

* cited by examiner

METHOD AND SYSTEM FOR PERFORMING CONTEXT-AWARE PROGNOSES FOR HEALTH ANALYSIS OF MONITORED SYSTEMS

CROSS-REFERENCE TO RELATED APPLICATIONS

The present application claims the benefit of priority to U.S. Provisional Application No. 62/395,845, filed on Sep. 16, 2016, which is hereby incorporated by reference in its entirety. The present application is related to U.S. application Ser. No. 15/707,417, entitled "METHOD AND SYSTEM FOR CLEANSING TRAINING DATA FOR PREDICTIVE MODELS", U.S. application Ser. No. 15/707,454, entitled "METHOD AND SYSTEM FOR ADAPTIVELY REMOVING OUTLIERS FROM DATA USED IN TRAINING OF PREDICTIVE MODELS", and U.S. application Ser. No. 15/707,500, entitled "METHOD AND SYSTEM FOR ADAPTIVELY IMPUTING SPARSE AND MISSING DATA FOR PREDICTIVE MODELS", all of which are filed on even date herewith and which are hereby incorporated by reference in their entirety.

BACKGROUND

Database systems and database clusters are becoming increasingly larger and more complex. The horizontal expansion of computing component resources (e.g., more and more computing nodes, more and more storage-oriented devices, more and more communication paths between components, more and more processing modules and instances, etc.) coupled with the proliferation of high-performance component instrumentation results in systems capable of generating extremely high bandwidth streams of sensory data. Even a session of very short duration to capture this data can result in an accumulation of correspondingly large volumes of raw data of very detailed complexity, which presents a large challenge to system administrators to perceive the meaning within the volume of data.

The problem is that given the size of modern database systems and clusters, it is becoming more and more difficult for administrators to efficiently manage the health and correct operational state of the technology given the quantities and complexities of data being collected for those databases. Conventional approaches often rely upon ad hoc logic that is notorious for having low-grade accuracy with regards to the current state of health of the system, and to then act upon their possibly inaccurate assessment of the state the of the system.

Machine learning has been proposed as a solution for managing and monitoring complex systems such as databases. Machine learning pertains to systems that allow a machine to automatically "learn" about a given topic, and to improve its knowledge of that topic over time as new data is gathered about that topic. The learning process can be used to derive an operational function that is applicable to analyze the data about that system, where the operational function automatically processes data that is gathered from the activity or system being monitored. This approach is useful, for example, when a vast amount of data is collected from a monitored system such that the data volume is too high for any manual-based approach to reasonably and effectively perform data review to identify patterns within the data, and hence automated monitoring is the only feasible way that can allow for efficient review of that collected data.

However, it is not normally feasible to use machine learning to model each and every single object within a system, nor is it normally feasible to model and track each and every item of detailed data captured for all of the objects in the system. Instead, model-based monitoring systems, which incorporate machine learning techniques for their prognoses, tend to navigate towards some finite set of predefined classes of decisions and outcomes. This is because, given the amount of effort and expense that is needed to generate even a single model based upon limited numbers of selected data signals, it would be highly impractical and quite un-scalable to expect to be able to do so for every component and sub-component within the system. Instead, conventional machine learning is typically applied to generate models for certain select components based upon certain select data signals for that component.

The problem is that this approach for applying machine learning and modeling only at the component level for selected signals makes it very difficult to account for and identify other objects in the system that are not being modeled, but which may pertain to influences or effects upon the specific components that are being modeled. One practical result of this limitation is that conventional systems are typically unable to pinpoint individual offending software/hardware components or the real culprits behind root cause(s) for problems that are identified from the machine learning models.

What is needed, therefore, is a method and/or system that overcomes the problems inherent in the prior approaches, and which permits identification of individual offending software/hardware components or the real culprits for problems that are identified from the machine learning models.

SUMMARY

According to some embodiments, described is an improved method, system, and computer program product that perform context-aware prognoses in machine learning systems. The approach harnesses streams of detailed data collected from a monitored target to create a context, in parallel to ongoing model operations, for the model outcomes. The context is then probed to identify the particular elements associated with the model findings.

Some embodiments of the invention also provide an improved approach to implement proactive health prognostics for a clustered computing system based upon the improved identification of root causes and effects within the system.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

As noted above, conventional model-based machine-learning monitoring systems employs a finite set of pre-defined classes of decisions and outcomes to perform health monitoring of a system. This means that conventional systems are unable to identify individual offending software/hardware components or the real culprits behind root causes for problems that are identified from the machine learning system.

Embodiments of the present invention solve this problem by performing context-aware prognoses in machine learning systems, where streams of detailed data collected from a monitored target are employed to create a context, in parallel to ongoing model operations, for the model outcomes. The context is then probed to identify the particular elements associated with the model findings.

Figure 1:
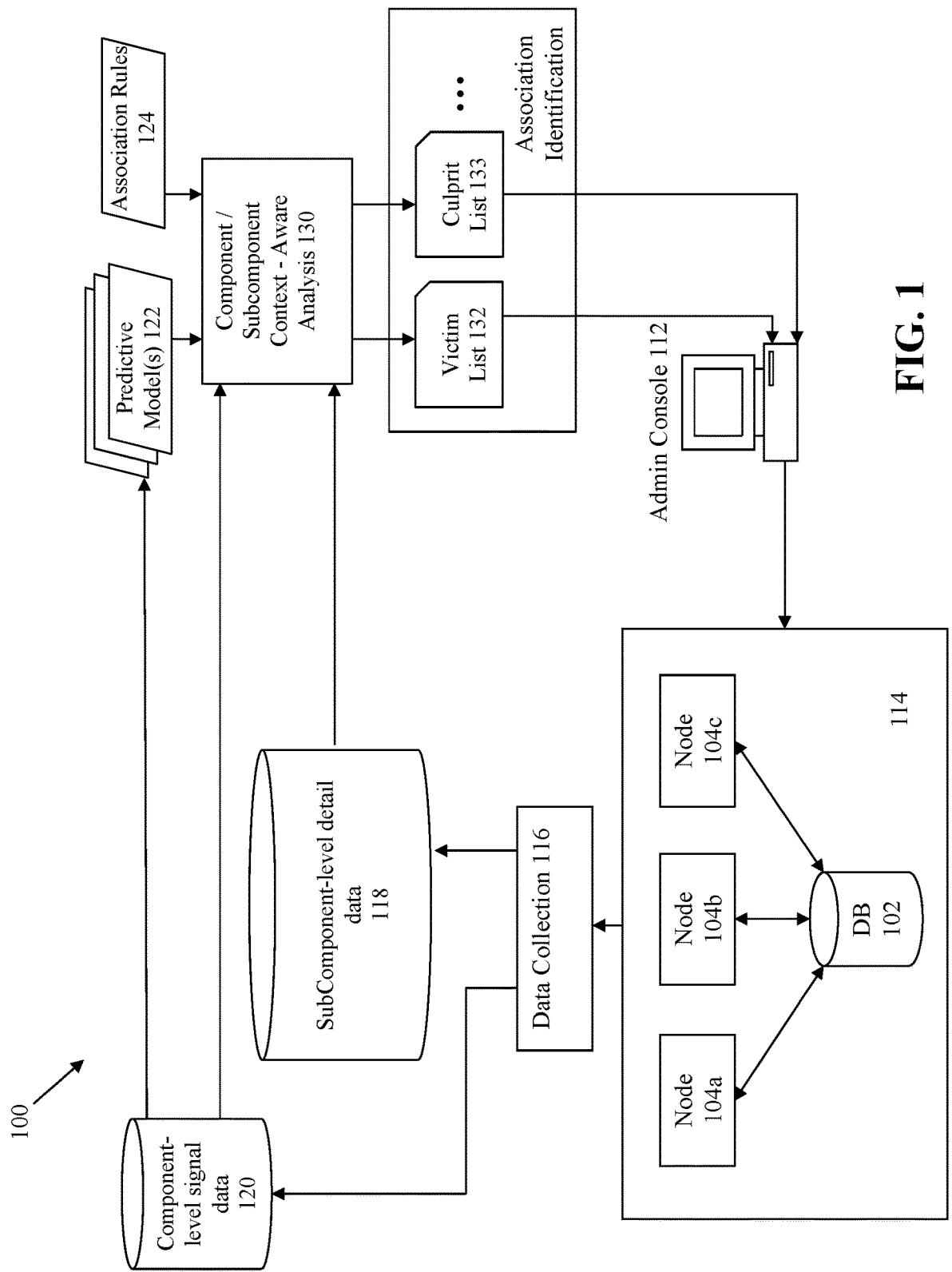
FIG. 1 illustrates a system for implementing context-aware prognoses according to some embodiments of the invention.

FIG. 1 illustrates a system 100 for implementing context-aware prognoses according to some embodiments of the invention. System 100 includes a data collector 116 that collects data from a database system/cluster 114. In the database field, a cluster refers to a system organization in which multiple servers/instances on a plurality of hardware nodes 104a-c connect to a single database 102.

The data collected from the database cluster 114 may include both component-level signal data 120 as well as subcomponent-level detail data 118. A "component" corresponds to an object or entity for which data is collected on a structured basis, and used to generate one or more predictive models 122 for which model-based analysis is applied to the system. In contrast, "subcomponents" corresponds to objects or entities for which detailed data is collected but where some, all, or a significant portion of that data is not used in a structured manner to generate predictive models pertaining to those objects/entities. In some embodiments, components refers to relatively higher abstraction of an entity within the system, such as a database instance or a node, while subcomponents refer to more granular objects or entities that exists within an individual component, such as for example, sessions, disks, software modules, specific SQL (structured query language) statements, or any other type of object or entity (whether hardware or software) that may be separately identified as existing within a larger component. In alternative embodiments, subcomponents may also refer to objects/entities that are hierarchal peers of the component, as well as objects/entities which are completely external to the component. Examples of peers would include other nodes/instances for which detailed data is collected but which are not used to generate predictive models for those other nodes/instances, and where the present inventive approach is employed to identify which of those other nodes/instances might be victims and/or culprits of faults identified on the component node/instance. Examples of external subcomponents would include cloud-based objects/entities for which detailed data is collected but which are not used to generate predictive models for those cloud-based objects/entities.

In the present example illustration, the "component" is a node/instance, and therefore the component-level signal data 120 corresponds to signal data that is collected as whole for the node/instance (e.g., memory and CPU utilization), inter-node signals that may correlate to behavior or activity pertaining to that node/instance (e.g., certain types of networking data), as well as database-centric signals that apply to database processing for that node/instance (e.g., database logging signals). It is noted that a datapoint collected from the monitored component target may include tens or even hundreds of signals values that together describe the holistic current state of the target (a target could be, for instance, a database instance or its host). While the present illustrative example identifies the component at the level of a node/instance, it is noted that other types of objects and/or entities may be considered "components" in other usage scenarios.

The subcomponent-level detail data 118 may include sets of information collected for some or all of the individual subcomponents within the system, such as sets of information collected for every session, every SQL statement, every disk, and every software module within the system. In total, there may be many thousands (or even millions) of these individual subcomponents within the system spread across multiple instances or nodes, or even within cloud-based devices.

As is evident, the detail data for subcomponents that are collected on an ongoing basis are likely to encompass an enormous quantity of information covering a very large span of different subject matter topics. The quantity of information is so large that it would be impractical to directly model all of this information for machine learning purposes.

However, even though the subcomponent-level detail data 118 is too large to directly model (and keep around in its totality), it is still nonetheless desirable to be able to access and use that detailed subcomponent information to assist in the process of diagnosing system problems. This is because there is a wealth of information within that subcomponent-level data that would allow one to pinpoint issues within the system with a high level of specificity and clarity.

Therefore, embodiments of the invention provide a context-aware analysis module 130 that permits model-based machine learning analysis using the component-level signal data 120, but which implements correlation to detailed data for specific subcomponents within the "context" of the subcomponent-level detail data 118.

One or more predictive models 122 are employed which have been generated based upon training data corresponding to the component-level signal data. The model training process, such as a supervised learning algorithm, creates the predictive models that function to identify predicted values for certain signals collected at the component level. Any suitable approach can be taken in the various embodiments to perform model training for any suitable model type, including for example, decision trees, discriminant analysis, support vector machines, logistic regression, nearest neighbors, and/or ensemble classification models.

The predictive models 122 can be created and applied to perform many types of analysis tasks upon a system. For example, the predictive models 122 can be applied to perform health monitoring for the database cluster 114. In this approach, the machine learning system performs automatic processing and transformation of large and extensive volumes of raw sensory and other diverse measurement data from the database cluster 114, where the learning model serves as the primary predictor and indicator of many of the database cluster aspects (e.g., current and predicted health state, and system availability). For example, applying the model 122 to perceived measurement data, events can be detected that potentially correlate to cluster health and performance states. Classified behavior can be identified that may be deemed to be normal behavior or some form of abnormal, anomalous, or fault behavior.

In the present embodiment, identification of abnormal/anomalous/fault behavior would result in further processing by module 130 to correlate that fault to specific subcomponents within the system. In particular, a set of association rules 124 are employed to perform "contextualization", to identify which of the subcomponents within the system should be associated with the component for the specific "context" that is being processed, e.g., for specific fault conditions and/or fault diagnoses. For example, the contextualization process can be used to identify which of the subcomponents within the system pertains to either "victim(s)" or "culprit(s)" for the fault condition. In terms of "cause" and "effect" analysis, the culprit would be identifiable as a cause of the fault, while the victim would be identifiable as one of the negative effects within the system of the fault condition. It is noted that the victims and/or culprits do not need to be within the same component. For example, in a networked system, the victim/culprit subcomponent may be entirely separate from a culprit subcomponent, e.g., on different instances, nodes, clusters, or even within a cloud-based component.

As previous discussed, the subcomponent-level detail data 118 is typically too large to directly model and keep around in its totality. Therefore, the current inventive processing is useful to identify which of that large amount of detailed information should be retained to assist in the process of diagnosing system problems. Since processing is applied to reduce the whole set of collected data to a smaller set of relevant data (e.g., only subcomponent-level detailed data that is associated to component-level data with respect to the context of the fault/diagnoses), this means that less data needs to be maintained in a storage device (such as memory or persistent storage), and allowing for more efficient and faster computations to be applied against that data perform and implement monitoring of a system.

Information from the context analysis can then be sent to the administrative console 112 with regards to the subcomponent(s) and/or subcomponent detail data, including for example, a victim list 132 and a culprit list 133. The information may be included within a health alert that is provided to the user or administrator at the administrative console 112.

Figure 2:
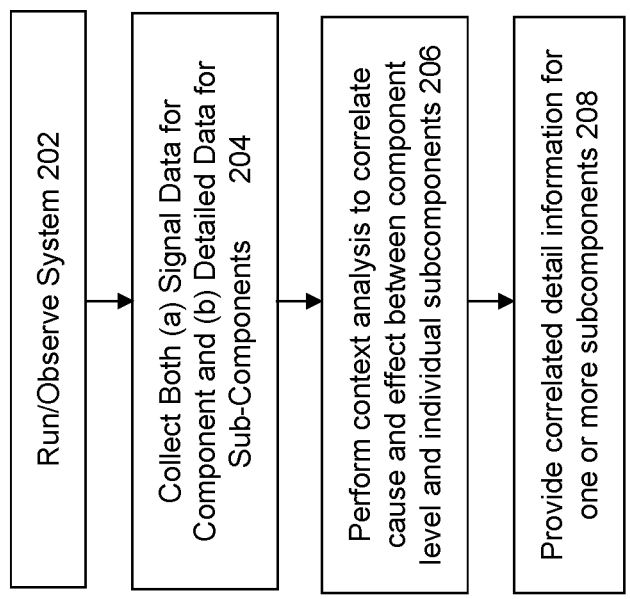
FIG. 2 shows a high-level flowchart of an approach to implement some embodiments of the invention.

FIG. 2 shows a high-level flowchart of an approach to implement some embodiments of the invention. At 202, a targeted system is observed for its behavior during its operation. The targeted system may be any entity, object, or hardware device to be monitored, such as for example, a database instance, processing node, and/or server.

For the system being observed, at 204, data is collected for that system. The set of data that is collected may include a large set of component-level signal data from the monitored target that may corresponds to tens or even hundreds of signals and an array of their sampled data (e.g. observed values). Any type of data may be collected for each signal. For example, in one embodiment, each set of data for a given signal includes one or more of the following: (a) a signal identifier such as a signal number; (b) signal name; (c) a grouping value that correlates related signals together; (d) a specific machine learning technique/model pertaining to the signal; (e) an indicator of whether fault was detected for the signal and/or a fault value (such as "high" or "low"); (f) an observed value for the signal; and/or (g) a predicted value for the signal. The collected signal value may pertain to any information of interest pertaining to any metric collectible within the system, such as for example, a database-specific metric pertaining to one or more values directly obtained from operation of a database system (e.g., database logging or wait metrics). In addition, the signal may correspond to an intra-node signals obtained for components and/or metrics that are directly pertinent to a given node or instance (e.g., memory and CPU utilization). Another example signal may include inter-node signals that may correlate to behavior or activity pertaining to multiple nodes (e.g., inter-node networking metrics).

The data collected for the system will also include subcomponent-level detail data for some or all of the subcomponents within the system, such as for example, subcomponents that include sessions, SQL statements, disks, processes, and/or software modules. Such information to be collected from these subcomponents may include, for example, response times, demand information, I/O times, I/O operations, as well as any other type of information that may be pertinent to an individual subcomponent. The information may be collected and/or maintained in any one or more of a non-structured format, structured format, or semi-structured format.

At 206, context analysis is performed to correlate cause and effect identification of specific subcomponents within the system for faults identified at the component level. As previously stated, the general idea is that initial fault identification and diagnosis can be made at a high "macro" level, since this allows permits very efficient processing using models created by the machine learning system. Only upon identification of the fault at the macro level is there the need to then proceed at the "micro" level, to now correlate the fault to specific details that are only visible within the subcomponent-level detail data. The correlated detail information for identified subcomponents can then be provided at step 208.

Figure 3:
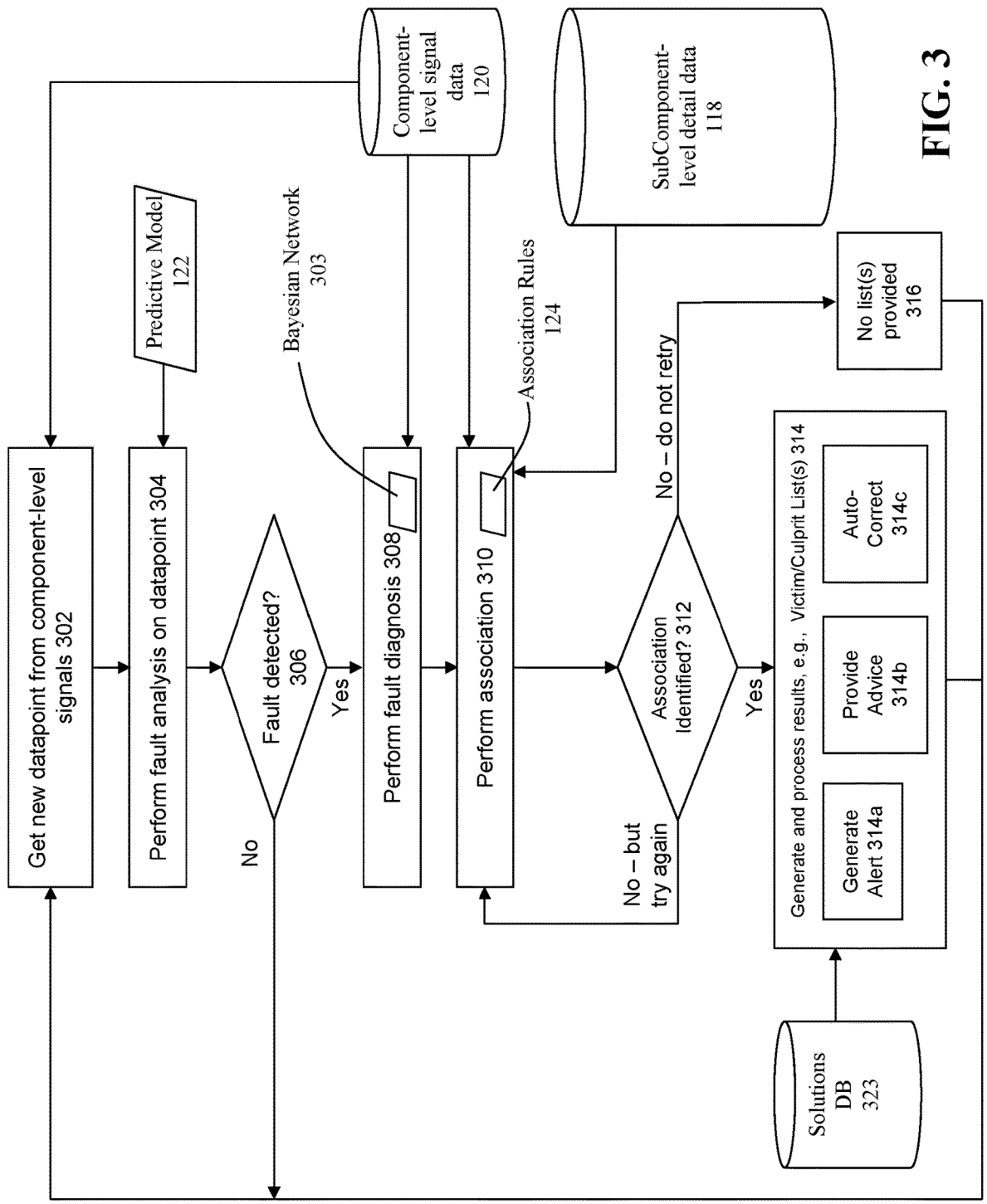
FIG. 3 shows a detailed flowchart of an approach to implement context-aware prognoses according to some embodiments of the invention.
Figure 4A:
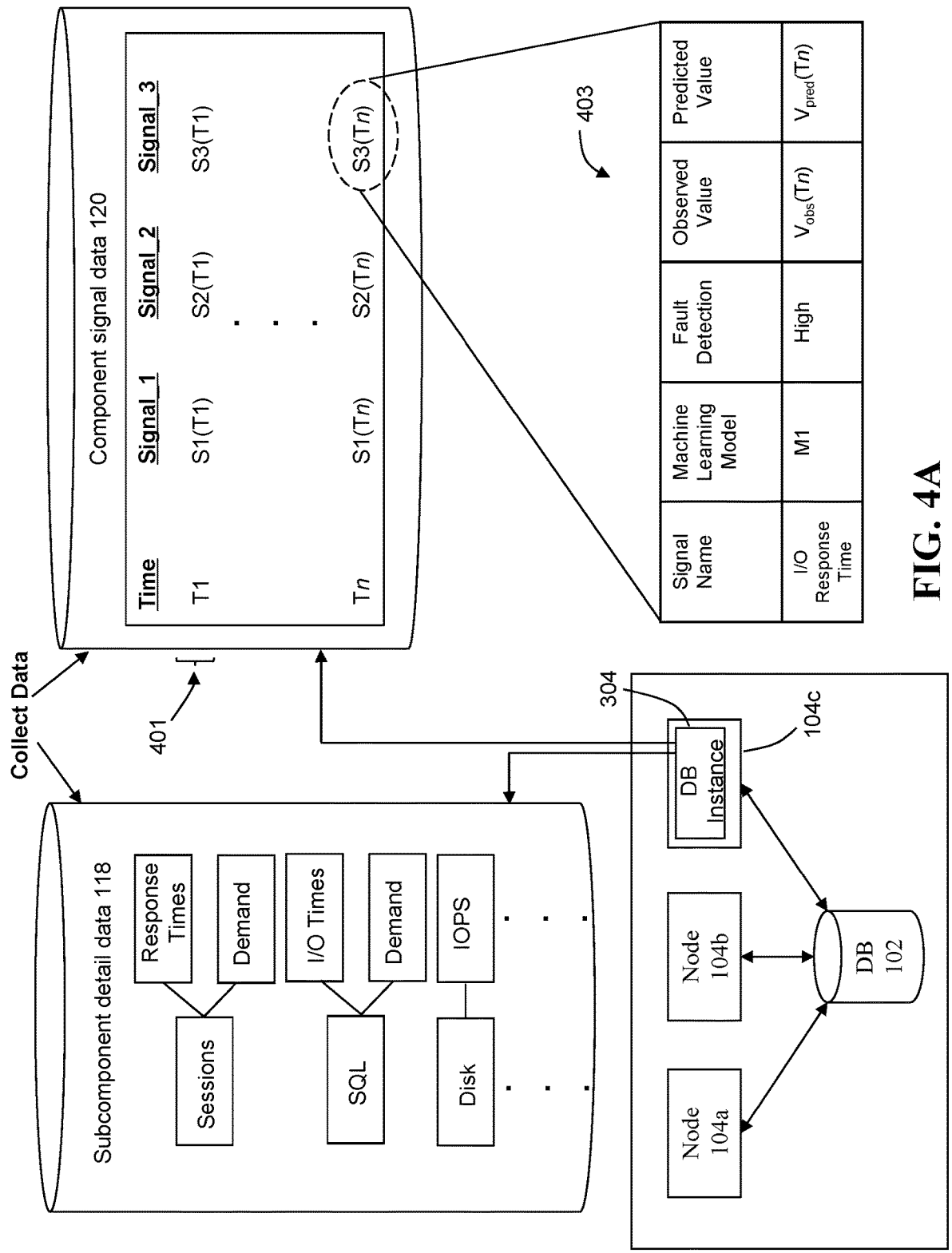
FIGS. 4A-E provides an illustrative example of an approach to implement context-aware prognoses according to some embodiments of the invention.

FIG. 3 provides a detailed flowchart of an approach to implement context-aware prognoses according to some embodiments of the invention. At 302, a new datapoint is acquired for the component-level entity being monitored. To explain this action, consider the data collected from a clustered database system as shown in FIG. 4A. Here, the data collection process generates both component-level signal data 120 and subcomponent-level detail data 118. At the component level (e.g., for a database instance 304 on node 104c), the collected signal data 120 may include sequences of signal data at a plurality of times T1 through Tn. This process in effect creates a time series of data for all of the collected signal data. Each set of signal data for a given time period is considered a "datapoint", e.g., the first datapoint shown in the figure for time T1 includes signal values for signals Signal_1, Signal_2, and Signal_3.

Each item of signal data corresponds to a set of information pertinent to that signal. For example, data set 403 shows an illustration of certain types of information that may be pertinent to a specific signal. Here, as indicated in the first column of signal data item 403, the example signal name is "I/O response time". Information provided for data item 403 may include, for example, one or more specific machine learning models that corresponds to that signal ($2^{nd}$ column), a fault detection mode for that signal (e.g., as illustrated in the third column for identification of fault if the signal is greater than and/or less than a predicted value and/or by a specific threshold), an observed value for that signal (fourth column), a predicted value for the signal (fifth column, e.g., based at least in part upon a predictive model), a signal identifier (such as a ID value that is not shown), a group identifier if the signal belongs to a related group of signals (not shown), as well as other data that would be of pertinence to specific signals. While this figure shows the signal data as structured rows within a table having multiple columns, it is noted that signal data in other embodiments may be structured differently. For example, other embodiments may structure the signal data in the CSV (comma separated value) format.

Figure 4B:
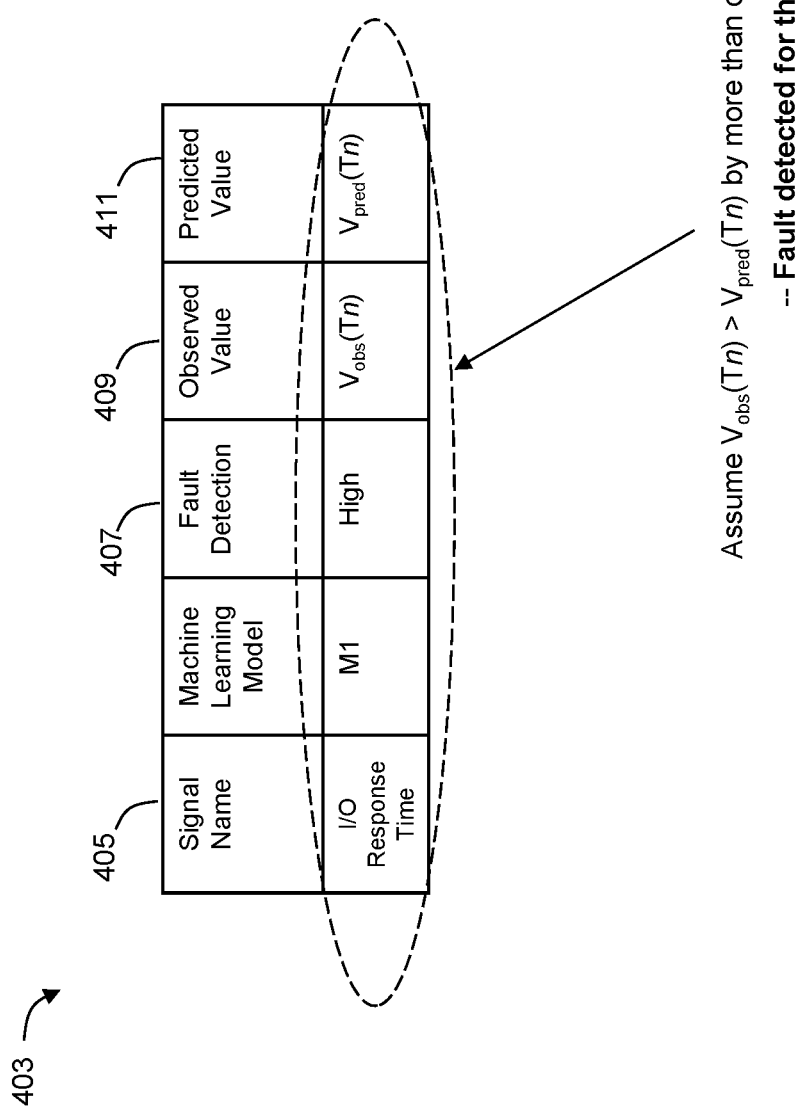

Returning back to FIG. 2, the next step at 304 is to perform fault analysis on the datapoint, where input from the appropriate predictive model is applied to identify whether a fault exists. This analysis may be performed for each signal within the datapoint. To illustrate this fault detection action, consider the signal data item 403 that is reproduced in FIG. 4B. Here, as indicated in column 405, the signal pertains to I/O response time data that was collected for a component (e.g., instance 304 from FIG. 4A). As shown in column 409, the observed value for this I/O response time signal is $V_{obs}(Tn)$, which is part of the component-level information that was collected within the datapoint for this particular signal. Column 411 includes the predicted value $V_{pred}(Tn)$, which was generated from the predictive model(s) 122.

The fault detection mode in the third column 405 provides the criteria for determining whether a potential fault exists for this signal. Here, column 405 indicates that a fault exists if the observed value $V_{obs}(Tn)$ is higher than the predicted value $V_{pred}(Tn)$. For the sake of illustration, it is assumed that $V_{obs}(Tn) > V_{pred}(Tn)$, and therefore a fault is identified for this signal within the datapoint 401. The above processing may be performed for each of the signals within the datapoint to identify all possible faults for the respective signals in the datapoint.

At 306 of FIG. 3, a determination is made whether any faults were detected for the datapoint. If not, then the process returns back to step 302 to acquire another datapoint. If, however, one or more faults have been identified, then the next step at 308 is to perform fault diagnosis relative to the signal(s) within the datapoint.

Any suitable approach may be taken to perform fault diagnosis. One possible approach in some embodiments is to employ a Bayesian network 303 to perform the fault diagnosis. Bayesian network analysis is an approach to use a probabilistic graphical model to identify probabilistic relationships between different variables and their probable dependencies.

Figure 4C:
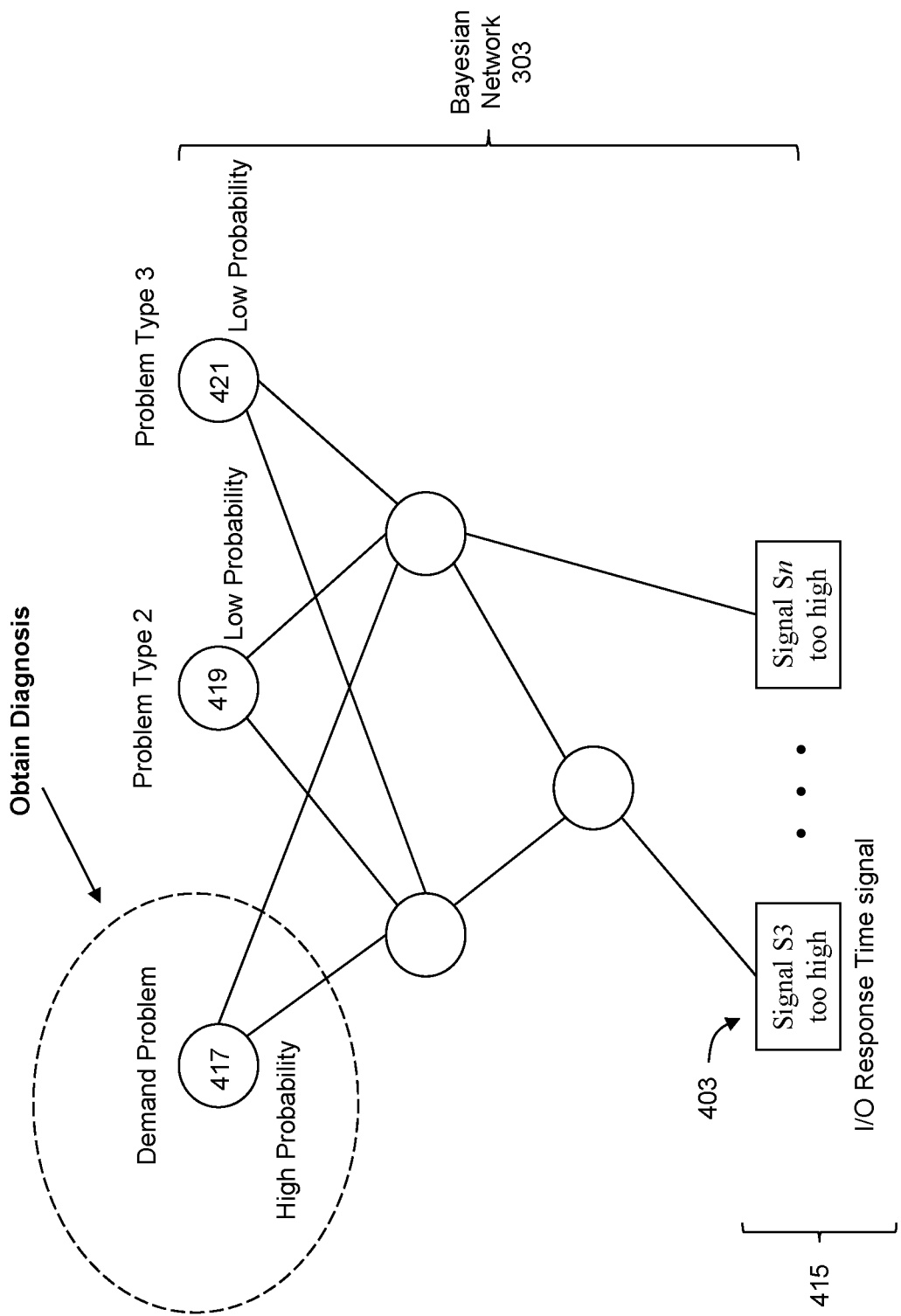

In particular, as shown in FIG. 4C, the Bayesian network model 303 may include a set of nodes 415 that represent one or more items of signal data within the datapoint, including signal data 403 that was previously identified as corresponding to a fault condition (where the observed I/O response time is too high). The network model 303 may include a network of hidden/latent variables, where the signal data is used to propagate states/probabilities through the graphical network that lead to various probabilistic outcomes. For example, this figure shows possible outcomes 417 (demand problem), 419 (problem type 2), and 421 (problem type 3).

From the multiple probabilistic outcomes, a selection may be made of one of the outcomes as the likely problem diagnosis. For example, as shown in FIG. 4C, outcome 417 pertaining to "demand problem" is identified as the most likely outcome due to its higher probability relative to the other outcomes. Therefore, this outcome would be provided as the fault diagnosis from step 308 for the current illustrative example.

Next, at step 310 of FIG. 3, contextualization is performed to associate subcomponent-level detailed data to the component-based fault diagnosis. One or more association rules 124 may be employed to perform the contextualization, where a specific association rule identifies (for a given fault diagnosis) how to determine which of the subcomponents may be considered a cause or effect of the fault. In particular, the rule will identify the specific detailed data for one or more subcomponents that should be analyzed, and/or the order that they should be looked at, for identification of associations such as victims or culprits for the fault.

In some embodiments, these rules are established through a learning process to determine the specific subcomponents and their attributes to be reviewed for the context analysis. Therefore, the rules may change over time as learning is applied to discover the relationships between components and subcomponents for various faults, as well as changes that may apply to the rules over time to account for changing system conditions.

In some embodiments, the rules are "data driven", where a data driven reasoning engine may look at the data and select a rule that can appropriately operate upon that data. The rule is then executed to implement the reasoning embodied in the selected rule. As such, embodiments of the invention may include one or more rules engines to process the association rules 124. It is noted that other types of rules may also be employed within embodiments of the invention. For example, "goal driven" rules may also be employed within various embodiments.

Figure 4D:
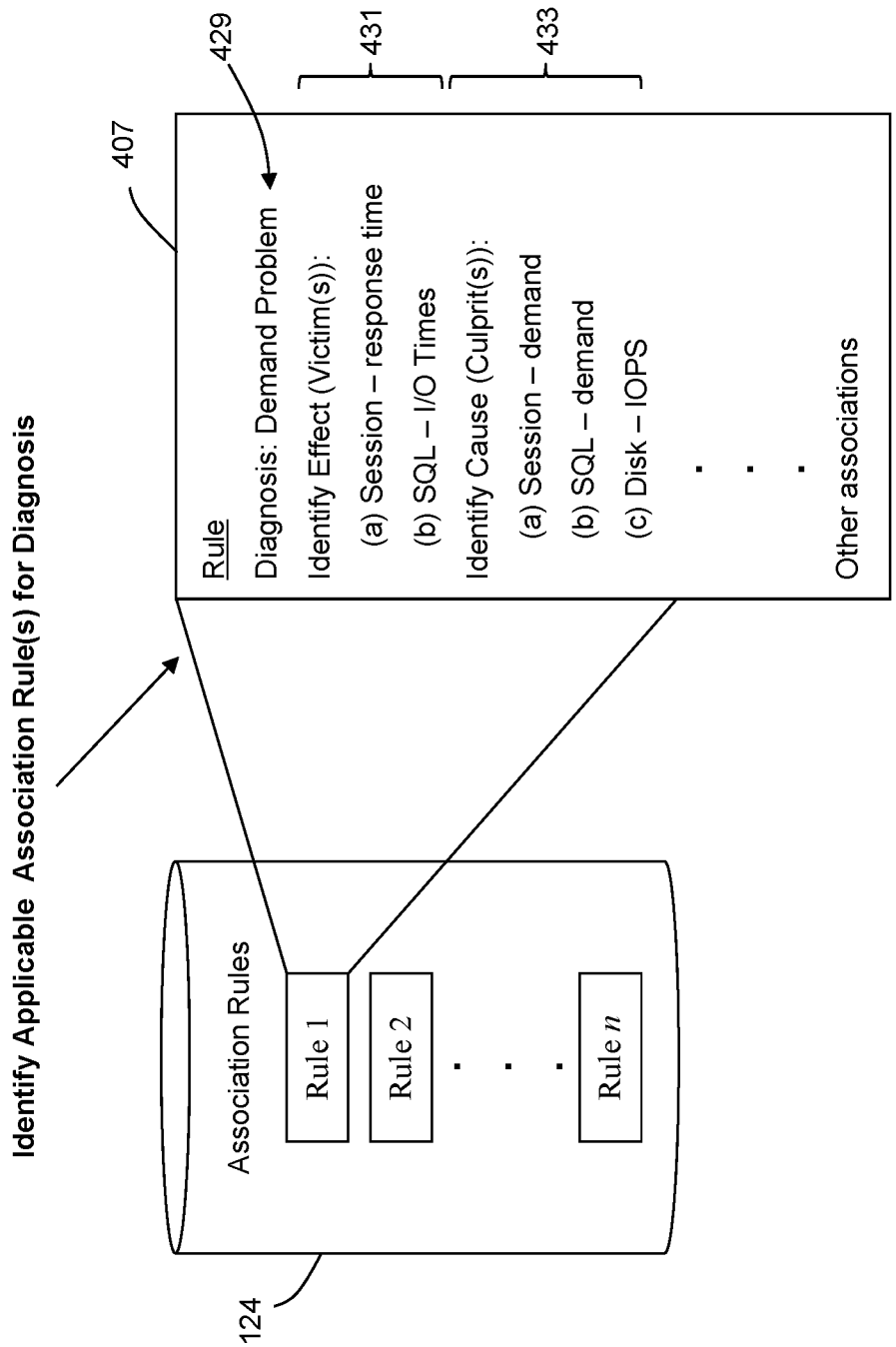

FIG. 4D illustrates an example rule 427 that may be applicable to some embodiments of the invention. Here, portion 429 of the rule 427 indicates that the rule is applicable to the fault diagnosis "demand problem" that was previously noted for the component-level signal data.

Portion 431 of rule 427 indicates that for effect/victim processing, the rule should start by (a) identifying any victims based at least in part upon whether there are any sessions that have problematic response times; and/or (b) follow by identifying whether there are any victims that correspond to SQL statements that correlate to high I/O times.

Portion 433 of rule 427 indicates that for cause/culprit processing, the rule should start by (a) identifying any culprits based at least in part upon whether there are any sessions that have overly-high resource demands; (b) identifying any SQL statements that correlate to high resource demands; and/or (c) identifying whether there are any disks that correspond to high IOPS values (high levels of I/O operations).

It is noted that the multiple possible categories of victims and culprits identified in the rule may all be applied to identify multiple categories of victims and/or culprits. Alternatively or in addition, the multiple categories may be used to define an order in which analysis is performed upon the different subcomponent types to identify specific ones of the subcomponents as the victims and/or culprits. This approach permits prioritization of specific data within the subcomponent information to review for application of the rule. While not shown in the figure, it is noted that various thresholds may be set in the rule for which data values must exceed, equal, and/or be less than for application of the rule to identify the victim/culprit.

Figure 4E:
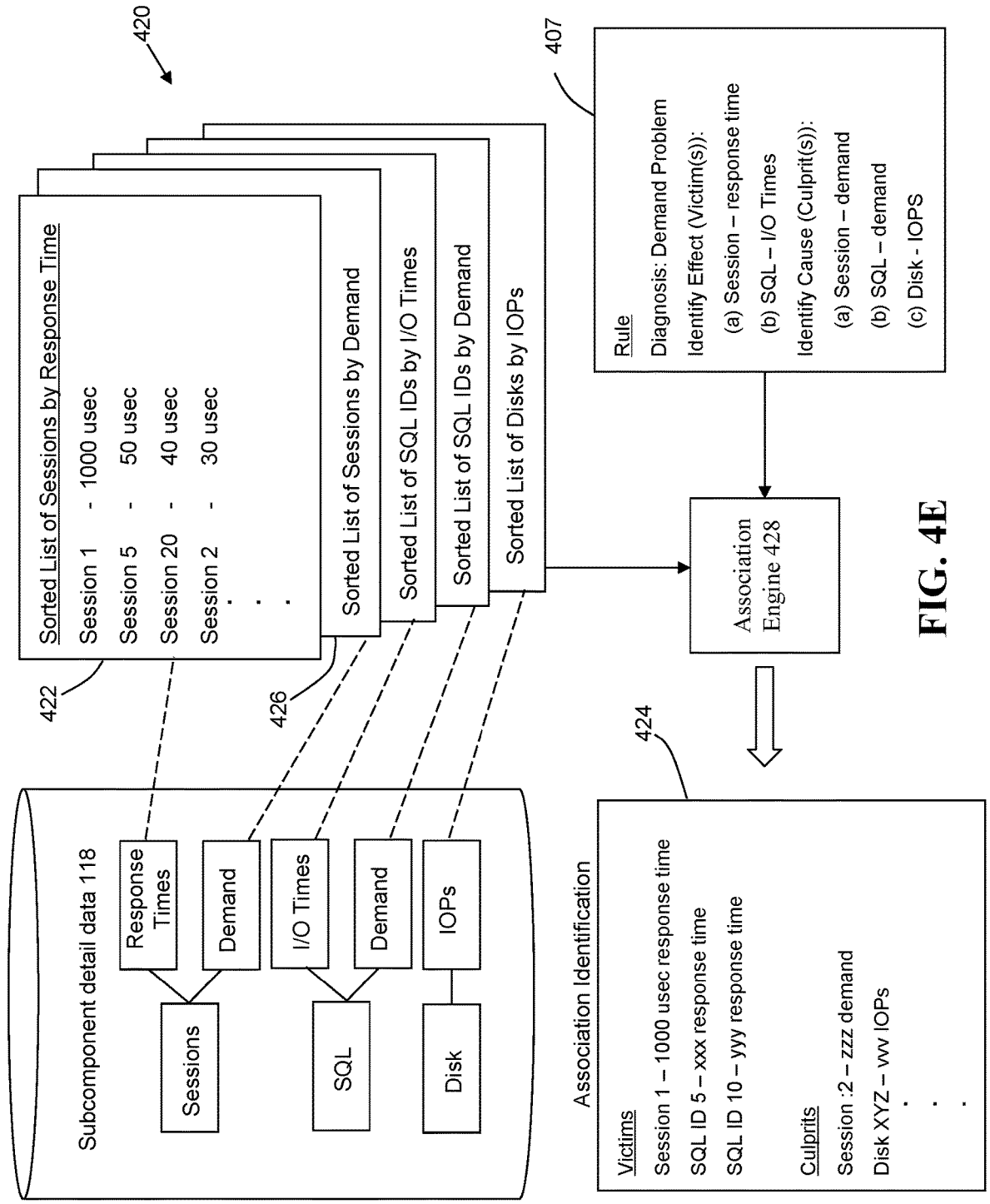
Figure 5:
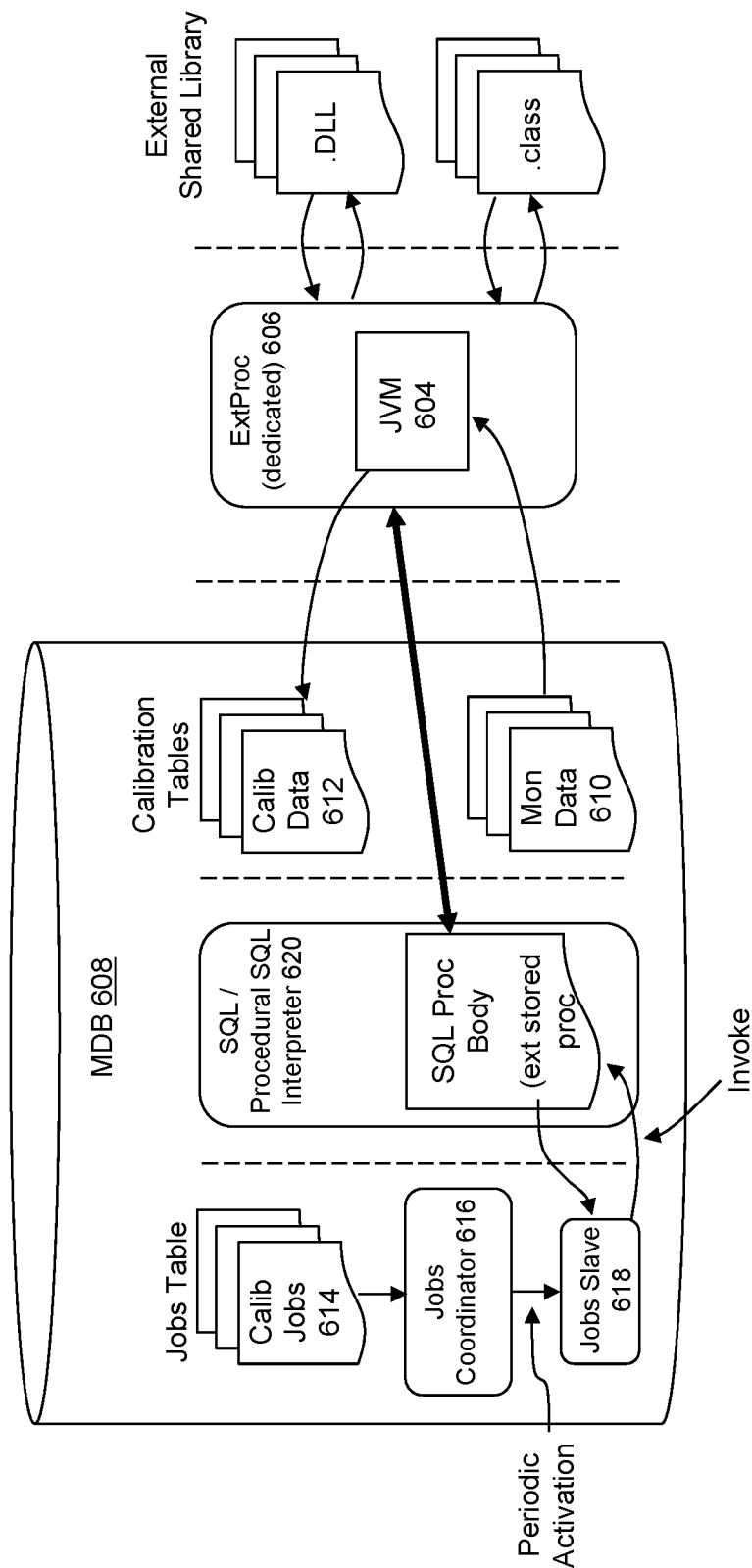
FIG. 5 illustrates the major processes in the health advising system in one embodiment.

As shown in FIG. 4E, the rule 407 may be applied to the subcomponent-level detailed data 118 to identify specific associations, e.g., victims and culprits. The subcomponent-level detailed data 118 may include detailed information about subcomponents such as sessions, SQL statements, and disks. For sessions within the system, the subcomponent-level detailed data 118 may include response time and demand data for each session. For SQL statements, the system may collect I/O times and demand information for each tracked SQL ID in the database. For disks, the system may track IOPS information for each of the disks.

One or more sorted lists 420 can be maintained by the system for each of the subcomponent-level data that is collected, e.g., where the top/bottom n subcomponents for the specific data of interest is maintained in a sorted list. For example, list 422 includes a list of the top n sessions sorted by response time. As can be seen from this list 422, session 1 can be easily identified from this list 422 as the session having the highest response time that has been recorded.

When rule 407 is applied to identify possible victims by rules engine 428, this rule indicates that the subcomponent type "session" is to be reviewed specifically for "response time". Based upon application of this rule against list 422, session 1 is easily identifiable as a subcomponent of this type having a very high response time value, and therefore this session is listed within structure 424 as being an identified victim. In a similar way, the rule 407 may be applied to identify one or more culprits, e.g., where the rule indicates that subcomponent type "session" is to be reviewed specifically for "demand" values to identify culprits, and hence the one or more lists 420 may be reviewed for the appropriate list 426 pertinent for application of this rule to identify culprits.

Structure 424 therefore includes the list of all subcomponents that have been identified as victims and/or culprits. While this figure shows a single structure that commonly identifies both the victims and the culprits, it is noted that some embodiments may use multiple lists to denote the identified subcomponents. The structure 424 may also include the specific data values for the identified subcomponents that pertain to the fault issue.

It is noted that the vast amount of data within the subcomponent-level detailed data 118 includes both data corresponding to subcomponents that behave normally as well as subcomponents that behave abnormally (e.g., are victims or culprits). By the processing above, streams of the data that pertain to usual data content are filtered out and only those with extreme data are allowed to undergo further analysis—signifying the parts that are contributing the most to the undergoing fault prognoses. This filtration helps cope with the expectedly vast volume of incoming data. In some embodiment, the streams can be further prioritized based at least in part upon drift and severity of their data content, eventually declaring one, or a few parts, that are highly suspect of being the original source of the diagnosed fault.

Returning back to FIG. 3, after step 310 is executed to perform the contextual association between the component-level data and the subcomponent-level data, a determination is made at 312 whether the victims/culprits have been adequately identified. If not, then the process may return back to step 310 to continue processing. For example, if the association rule includes a prioritized list of subcomponent types to check for the association, and the previous processing at a higher level of priority does not identify the victim/culprit, then this looping action may be taken to check for subcomponents at a lower level of priority to identify the victim/culprit.

In some cases, even if the victims/culprits have not been adequately identified 312, the process will proceed to 316 without providing any lists of victims and/or culprits. This approach may be taken, for example, if the application of the rules through all levels of prioritization have been applied without identification of a victim/culprit. In addition, a threshold level of time and/or computing resources may be imposed to make sure the above processing does not exceed certain established levels, e.g., during high-peak periods of the day. Therefore, if the threshold is reached, then the process proceeds to 316 even if all subcomponent priority levels within the rule have not yet been processed.

If the victim and/or culprit has been identified, then the victim/culprit list(s) are generated and processed at step 314. Numerous possible approaches can be taken to address the identification of specific subcomponents that are victims and culprits of the fault diagnosis. For example, at 314a, an alert can be provided to the administrator identifying the health-related problem in the system, and identifying the possible culprits and victims of that problem. In addition, at 314b, advice can be provided to help the admin address the problem. The advice may include a set of possible actions that can be taken by the admin to relieve or resolve the problem. Another possible approach, at 314c, is for the system to take actions to automatically correct the identified problem. For diagnosis of a fault condition where specific culprits and/or victims pertaining to subcomponents were discovered pursuant to the processing described above, then automated processing may be taken to address those causes and/or effects upon those subcomponents. For example, for the "demand problem" diagnosis discussed above, automated processing may be taken to stop or reschedule work by identified culprit SQL statements (particularly low priority SQ statements) so that victim SQL statements (particularly high priority SQL statements) can continue processing with less effects upon the victim statements. A solutions database 323 may be applied to identify which of these solutions to apply, along with specifics for that selected solution. In some embodiments, context-aware corrective actions can be derived using a state transition table.

Once the datapoint currently under examination has been fully processed, the process returns back to step 302 to select another datapoint and the above processing steps are applied again to the newly selected datapoint.

Therefore, what has been described is some embodiments is a new approach to implement context-aware, multistep prognoses to machine learning-based health monitors by supplementing model-based operations with parallel streams of live detailed data obtained from various parts of the managed system.

This approach harnesses streams of detailed observations data collected from the monitored target to create context, in parallel to regular model operations, for the model diagnostics and prognostics results. The approach supplements model-based operations with parallel streams of live detailed traffic obtained from various components of the monitored system. Streams with usual data content are filtered out and only those with extreme data are allowed to undergo further analysis—signifying the parts that are contributing the most to the undergoing fault prognoses. This filtration helps cope with the expectedly vast volume of incoming data.

Therefore, the ability of the present embodiment to pinpoint the part, or parts, from where the diagnosed fault first originated is a greatly appreciated feature in any machine learning-based health monitor and, together with a reasonable corrective action, it will enable users to shorten the time to recovery significantly. This will translate to higher acceptance and greater adoption of machine learning solutions.

According to some embodiments, the invention may be implemented in a cluster health advisor system (which may be referred to herein as a "Cluster Health Advisor" or "CHA") that employs supervised learning techniques to provide proactive health prognostics. The health advising system performs online monitoring for the health status of complex systems database instances and hosts systems in real time. This system leverages an integrated battery of advanced, model-driven, pattern recognition and automatic problem diagnostic engines to accomplish its monitoring tasks.

Figure 6:
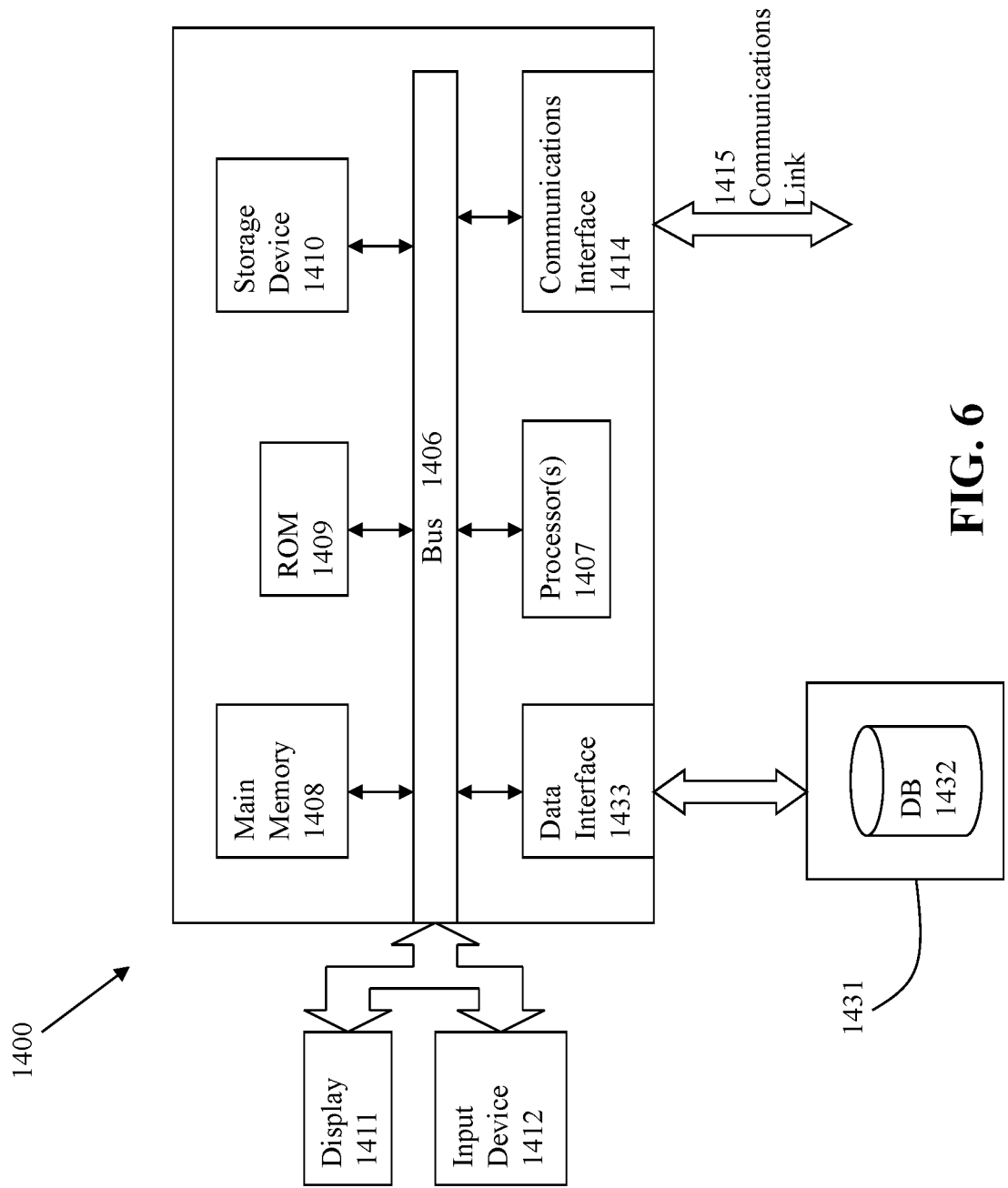
FIG. 6 is a block diagram of an illustrative computing system suitable for implementing an embodiment of the present invention.

FIG. 6 illustrates the major components in the health advising system in one embodiment, and their overall interactions responsible for the treatment of training data and the generation of predictive models. Core functionality is implemented by a set of Java classes installed on every host where the Management Datastore (MDB) 608 is expected to run. These classes execute inside a java virtual machine (JVM) 604 that is contained within a dedicated external process (EXTPROC) agent process 606 (e.g., the JVM runs in same machine as the MDB 608 but is external to the MDB 608), thus allowing for more flexibility in terms of what JVMs to choose from, e.g., to address hot spots for the JVMs. Additionally, the execution is isolated from the MDB 608, and hence does not adversely impact the performance or reliability characteristics of the MDB 608. The EXTPROC 606 will be spawned directly by the database server and it will last as long as needed by a job to scan the system.

The monitoring data 610 is collected and stored in the MDB 608. The collected data 610 may be subject to various factors that cause values to often reach outlier levels. A preprocessing step is thus employed to effectively cleanse the training data from all of these anomalies and outliers before it can be used for model training. In some embodiments, the training data is treated in an automatic way to ready it for model training with minimal user intervention. While this process is typically conducted in the industry by manual means and exclusively by experts in statistics and machine learning, the above-described embodiments provide approaches to implement this even where some intended users may lack such expertise.

Health monitoring is performed for critical subsystems of the clustered systems, including for example, the database instance and the host system. It is noted that additional cluster systems may be supported as well. The system is architected using software components that work together in tandem to determine and track the health status of the monitored system, where the components periodically sample wide variety of key measurements from the monitored system, which will then analyze the stream of observed data in reference to established base models. Anomalous readings (referred to herein as faults) using these approach in a rapid way with a high degree of confidence. Once faults are detected, automatic probabilistic-based problem diagnosis can be invoked, where the system infers the type of the underlying problems and their root causes from the set of faulty readings. Users will be advised with a set of recommended correction actions to alleviate the reported problem(s).

One important task is the proper selection and assignment of predictive-based models to targets. To foster robust analysis, selection is made of a model that can faithfully captures the target's operating modality expected during the monitoring period. Several models can be created for targets that could operate exclusively in significantly different operating modes. Model generation is facilitated by a training process that is sensitive to training data. Once users identify a significant new operating modality of their target, they can generate a new model to be associated with monitoring during this modality. Training data 612 is gathered (e.g., automatically gathered and sorted as per time dimension) during target monitoring. Users are guided to identify and select related and clean training data set for a desirable period when the target was operating within a unique mode.

The evaluation and preparation logic include the periodic scanning of target monitoring data (stored in system's datastore) and their corresponding generated output (e.g. any detected faults and diagnosed problems held in tables of the datastore), highlighting various potential anomalies and outliers that data may contain, and analyzing the data (using robust statistical methods) for its goodness to serve as input to new system's model training. Techniques such as imputation could be applied when necessary to enhance the fidelity of collected data and to improve the quality of new model generation. These specialized components are periodically invoked and driven by a scheduler as a scheduled job at predefined intervals. The high-quality training data produced at the end of each run cycle and the newly calibrated models are added to the datastore. One or more jobs 614 can be accessed by a job coordinator 616, which periodically activates one or more job slaves 618 to perform the training/processing jobs. An interpreter 620 may be used to access a set of procedures, e.g., PL/SQL external procedures, having one or more shared libraries and/or java classes. Their purpose is to collect, analyze, evaluate, cleanse, and transform the data observed during target online monitoring and prepare it into high quality training data. The resulting data is sufficiently adequate for new target predictive-model training.

An additional embodiment pertain to a service-oriented method for cleansing training data used for recalibrating predictive models.

Outliers are known to potentially exist in raw datasets intended for retraining of predictive models in many fields.

In particular, sensory data collected from clustered databases may be subject to various sampling and calculation errors and, if left untreated, these errors cause significant harmful variance errors in the generated models. Existing solutions typically require trained statistician experts with domain experience to, mostly manually, validate each individual data point in the dataset and to interpret the mathematical outcomes of some domain-specific statistical analysis tools for validation. This might hamper the widespread adoption of machine learning solutions.

One major improvement provided by some embodiments is the ability for ordinary database DBA's and users, with little or no mathematical and statistical background, to effectively administer the preprocessing of training data, and to remove specious outliers. Typically, this operation requires an expert with statistical and mathematical backgrounds in addition to domain experience. Rather than depending on intrinsic numerical characteristics of training data as the main arbiter for validations, which is the norm in the industry, this method introduces key service performance metrics to adjudicate on the permissible sequences of data to accept it for retraining purposes.

It is noted that a datapoint collected from the monitored target may include tens or even hundreds of signals values that together describe the holistic current state of the target (a target could be a database instance, or its host). In some embodiments, included as part of these signals are additional, critical, values of key performance indicators with corresponding timestamp (examples of such KPI's cpu utilization, database time per user call . . . etc) that end users are familiar with and accustomed with to report the quality of the fundamental services provided by the target systems. An interface is provided to allow users to express the desired ranges of the service quality their business would normally accept.

For example, a CPU utilization range may be chosen to be within 15% and 35%, similarly the DB time per user call could be between 7 msec and 25 msec. The system then calculates the intersection of the set of user-defined KPI ranges (i.e. logical AND) considered together and apply the computed result as a preliminary filter against the whole input dataset. The filtering is performed such that only the datapoints that satisfy the filter would be admitted as candidates for model recalibration, with all others being ignored. Since any one KPI is in fact an aggregation of some QoS aspect of the target, by this definition, none of the individual signals drawn from the same system is expected to assume an anomalous value if the aggregate itself happen to fall within an acceptable range.

Therefore, through the use of declarative and familiar service performance metrics, this approach allows ordinary database users to carry on the tasks of preprocessing training data, a task that is necessary for the successful retraining of machine learning based predictive models in the field. This method, in essence, enables the wide deployment of machine learning products by eliminating the need for highly specific and advanced experience to handle this important task effectively in the field. An example approach to selection of training data for predictive models is described in co-pending U.S. application Ser. No. 15/707, 417, filed on even date herewith, which is hereby incorporated by reference in its entirety.

An additional embodiment pertain to a method of using system detrimental events to remove outliers from data used in the re-training of predictive models.

Outliers and other anomalous data have the potential to infiltrate training datasets collected from target systems during monitoring. When the monitored system undergoes some detrimental event, the sensory data collected around this period tends to exhibit numerical values beyond their normally acceptable ranges. For example, in clustered database systems, during scheduled procedures like starting and shutting instances or during nonscheduled procedures like node failover events, monitored systems can be stressed momentarily beyond acceptable and normal limits. These extreme values can be harmful if used to retrain predictive models.

Existing solutions typically require trained statisticians or data scientists with domain experience to manually validate each individual data point in the training dataset, and to interpret the mathematical outcomes of some domain-specific statistical tool for validation. This requirement may hamper the widespread adoption of machine learning solutions. Therefore, one main hurdle in the path for autonomous health monitoring products is the challenge to reduce the dependency on human expertise to interpret or administer machine learning model based solutions.

In some embodiments, purging training data from unwanted anomalous patterns is performed in the generation of adequate models to guide this monitoring. The present disclosure provides a framework to register and track operational and environmental events that are deemed to have detrimental impacts on the monitored system. When any of these events are detected, a timestamp will be produced and used to purge any data samples generated near its vicinity.

In particular, when the monitored systems (targets) are operating under some hazardous conditions, then some of its collected signals are expected to show outlier values. A hazardous condition could be any event that exerts unpropitious circumstances upon the monitored target, and typically manifest itself as unjustifiable extreme magnitudes of the collected metrics. For example, when a node is evicted from the cluster and its existing workload is being transitioned over to the surviving nodes, a temporary and unusual strain occurs and needs to be dealt with by the surviving nodes. For the duration of such events, many of the signals observed values, sampled from the impacted targets, could assume extreme ranges that would adversely impact the re-training process and render the resulting new models invalid.

In implementing the present embodiment, a set of signals is identified with direct correlation to various detrimental events. A filter takes a declaration as input to indicate the name of signals, and their particular ranges, that are indicative of detrimental events. The filter would then scan all candidate data sets looking for any datapoint that might be a manifestation of any of the given detrimental events. If found, the filter will then delete the datapoint as well as a prescribed number of preceding as well as antecedent datapoints. This approach therefore cleanses the training data from any pre or post perturbations that might accompany the detrimental event.

The embodiment of the invention therefore purges the training data of any undesired anomalous patterns to generate the models. As such, this approach provides a significant improvement towards the automation of machine learning model re-training. An example approach to using system detrimental events to remove outliers from data used in the re-training of predictive models is described in co-pending U.S. application Ser. No. 15/707,454, filed on even date herewith, which is hereby incorporated by reference in its entirety.

Another embodiment pertains to a multilevel approach for imputing low to severely sparse and missing data.

Many machine learning algorithms prefer to operate on full datasets without any missing information. In the cases of missing data, the typical expectation is to employ some imputation techniques to patch the dataset offline to make it usable. This is usually performed for data with low degree of missingness (i.e. not exceeding 20%), prompting datasets with sparse information to become almost futile. Simulation is typically used to generate random values modeled after some perceived distributions and is not utilized for imputation purposes.

Some embodiments address this problem by optimally handling missingness not only at low but also greater degrees. At low missingness, the present approach first employs iterative techniques to impute new values while relying heavily on observed data alone. As missingness increases, whether overall or in specific variables, imputation techniques used in the first level begin to lose robustness and become ineffective. The method compensates by adding new data brought from external but closely related sources already kept in either trained models or succinct distribution formats. The compensation using external data is incremental and in proportion to missingness severity. If no observed data can be used, the method handles this case by fully compensating via reliance on external sources.

The present multilevel treatment approach to missing data adapts to the degree of missingness exhibited by the data. For low to moderate missingness (e.g., below 20% of missingness ratio) the approach can make the assumption that missing data is Gaussian and the system employs the Expectation Maximization algorithm to estimate theta and sigma model parameters relying on information presented by the observed data only. Once the model parameters have converged satisfactory, then the approach uses Cholesky decomposition to impute any missing data conditioned on the observed part of the data.

As the missingness ratio increases, the Expectation Maximization (EM) may not converge, or some signals might be totally absent. At this level, the method attempts to re-assemble the signals in subgroups and repeats the EM process to see if it can succeed on any subgroup of the original signals—using only the observed data. The method then "patches" any missing components of the resulting covariance matrix with realistic and reliable values obtained from external resources. If the missing degree is too severe for the patching mechanism to work successfully, the system then resolves to classical simulation using closely related models already constructed from similar data for this purpose. This multilevel approach enables treating data missingness adequately at any of its severity levels while utilizing, as much as possible, the actual observed data.

To allow for the above approach to fall back to some necessary information readied from a reliable external resource, the external resources can be constructed with this purpose in mind, beforehand. An offline statistical analyzer tool can be employed to fine tune a statistical model, iteratively, for any group of signals as newer data is scanned. By feeding the tool a large amount of data it can produce a refined and nicely generalizable model that is used to assist the imputation process as described above.

Therefore, this approach addresses the problem where data for many signals collected from clustered databases were found to be sparse to varying degrees. This method addresses these issues by using a gradient solution that is attentive to imputation needs at each of several missingness levels. The solutions provided by this method facilitates wider deployment and acceptance of machine learning products. An example approach to impute missing data is described in co-pending U.S. application Ser. No. 15/707,500, filed on even date herewith, which is hereby incorporated by reference in its entirety.

Yet another embodiment pertains to an analytical approach to evaluate the quality of datasets for retraining predictive models of clustered databases.

For supervised training of predictive models, the quality of the training data (e.g. in terms of sufficient count of distinct patterns that correctly capture the steady states aspects of target systems) is important for good model retraining. Existing solutions expect human experts to perform the task of validating the quality of the training datasets, mostly in an ad hoc fashion. However, such expert resources cannot be assumed to be available in the field all the time, and this lack of availability might hamper the successful deployment and acceptance of supervised machine learning solutions. Additionally, without some sort of established reference serving as a baseline, numerical analysis methods on their own may not be able to determine if a dataset captures enough normal facets of the target system.

Some embodiments provide a method and system for the introduction of a finite set of analytical terms that can sufficiently describe the information embodied by the patterns found in arbitrarily large training datasets. This set of analytical terms can then be used as the bases for comparisons and used to draw important conclusions about the quality and suitability of the corresponding datasets to retrain predictive models. This approach helps to systematize the preprocessing phase and simplifies model verification.

The approach systematizes a set of key analytical terms, to be derived for any arbitrary large training dataset (e.g. from monitored clustered databases), and then compares the sets themselves to effectively establish similarity scores among their corresponding datasets. This method maps a dataset to its primary clusters and then analyzes the clusters in terms of their count, mutual separation distances, and the overall multidimensional volume they occupy. An automatic evaluation of the suitability of training datasets for model retraining purposes is determined by appraising their own similarity scores to those of established or default datasets.

Therefore, the embodiment provides an approach that simplifies, systematizes, and abridges the model verification processes. It can be utilized by expert users or executed directly when human assistance is limited. This would improve the successful acceptance and market penetration of supervised machine leaning-based solutions.

An additional embodiment pertains to an approach for implementing predictive model selection based on user-defined criteria in clustered databases.

As the compute conditions of target systems may undergo significant transformations over time (e.g., due to changes in workload, configurations, etc.), there exists a need for new models to be plugged in that are more adequate for the new conditions. This raises the issue of what model the user should choose and how to search for it. Current industry solutions tend to require entirely new training in order to satisfy any new conditions. This is, of course, a costly operation and grossly inefficient since it would discard previous model development rather than leverage it.

In particular, when the operating conditions of the monitored system (target) departs away from its current operating state permanently and by a significant magnitude, then the already used models may become inadequate for the new operating state, the user is recommended to update the models and use another and more relevant models.

According to some embodiments, the inventive approach identifies critical operational parameters of target systems and tags newly developed models with these parameters (e.g., values demonstrated by the target systems during periods of training data), thus allowing all successful models to be preserved for future use. The method translates model search and selection exercises into a feature or tag matching problem. Given the new parameters of the target system, this method would then search the library of existing models for the one with the most matching tags.

Rather than initiating a whole re-training process (as it is the typical case in the industry) the user could select from the model library one model that is quite most adequate for the new operating state.

The selection process works as follows: The KPI list and their ranges for generating new models are saved and passed on as tags (features) attached to the new models. The selection process is transformed into a matching problem, e.g., given the new values of desired KPI ranges, workload class and intensity, compute resource configuration find the model with best matching features. The search is heuristic and the outcome list of models is ordered according to their matching score. The user may pick the model with the highest score, or decide to initiate a whole new re-training process if the scores are found to be low.

Therefore, the present approach is able to preserve successfully developed models and leverage them for future use. This offers not only increased operational efficiency, but also helps to reduce down time of machine learning products in the field.

Yet another embodiment pertains to an approach to perform pipelining multiple of predictive mini-models together to improve diagnoses and prognoses quality in clustered databases.

To monitor the health of a software component using machine learning techniques, a model that captures the main operational aspects of the component is typically constructed to steer the health diagnosis and prognosis process. Typical modeling approaches tend to construct a dedicated model for each individual software component with great emphasis on the intrinsic features of the target component itself. Important clues from the surrounding environment and other interacting components are mostly left untapped. As such, the prognoses performed in such a compartmentalized fashion with isolated models tend to lack holistic awareness and may produce low-grade outcomes.

According to some embodiments, the present invention constructs composite models that are made of an assemblage of mini-models reflecting on the environment and other external components surrounding the target. The diagnoses and prognoses process would then leverage this holistic awareness and produce outcomes with higher accuracy.

Consider as an example the operations of a database instance. While its intrinsic design and algorithms are expected to constitute the main factors which impact its operational behavior, the state of the operating system that hosts the instance would also have direct impacts on it as well. Such inter-component impact is not thoroughly captured by traditional machine learning model construction techniques, where the training data used in the training of new predictive models for the database instance is made of signals that emanate from the instance itself. The same is true for the operating system models, which gives rise to compartmentalized and semi-isolated diagnoses.

The improvements of the current embodiment in this regard are to replicate the models of all system components the target is dependent on, and to stitch these models in a fashion that reflects their overall topology and service interactions.

When monitoring a database instance as a target, a composite model is used to achieve a consolidated and integrated awareness of the target's state. A model of the host operating system is cloned and attached to the instance own model. Results produced by the host model are propagated as input into the instance model to provide clues about the external but impacting state. More models can be assembled in the same fashion.

To operate this composite model, some or all necessary data are merged together and fed as input during monitoring. Since data merging involves synchronization among all sources of data, the present approach can use time as the synching dimension.

An issue also arises with respect to which particular external models should be selected for the composite model construction. In some embodiments, a cross-reference between the models at their generation phase is preserved as a guiding selection attribute.

Therefore, since the performance of the diagnoses and prognoses process is measured by its accuracy in terms of the rate of false positives and false negatives in the outcome decision, the present approach can be applied to significantly improve the accuracy of the diagnoses and prognoses processes that are built with machine learning techniques.

Another embodiment pertains to an approach for implementing online performance assessment of predictive models.

There is a risk of dealing with false outcomes neglectfully if the performance of applied predictive models is not regularly verified. To handle this problem, some in the industry may choose to retire their models periodically after a certain period of time, say three to six months from their deployment, and generate new ones. However, there are no commonly established processes in the industry to validate and possibly retire machine learning-based predictive models after they have been deployed.

According to some embodiments, the invention provides comparative analysis and tracking of long-term residual behavior of active models to determine if a persistent drift expands beyond an acceptable threshold. The governing assumptions underpinning the algorithms of this method follow that any fault in the target system would not last for extended periods and that, in general, model diagnostic findings should be corroborated by the target key performance indicator.

In order to make sure that online predictive models continue to perform reasonably well, the approach evaluates their performance continually while they are plugged into operation. The performance assessment method is employed to implement the continual sizing up of a model's residuals and the degree of correlations between the models' output decisions and the projections of the target's key performance indicators.

All (or a significant amount of) diagnostics and prognostic data produced by the model, as well as the monitoring data, can be stored in a central database alongside the key performance indicators. When the model is performing well, its residuals tend to resemble those produced with the validation dataset—except when failures are detected. The KPI's readings, on their part, would corroborate the models' diagnostics and prognostics findings.

When operational models begin to lose their effectiveness, either gradually or otherwise, their residuals become distinctively worse than usual. The challenge is on how to correctly differentiate between cases of bad residuals caused by model lack of efficacy (what is the main concern) versus the case of what could be the manifestations of temporary failures. The present methodology builds on a simple assumption that real faults on the monitored target will not continue to exist for an extended period of time (otherwise it will defeat the purpose of having the target as a useful service provider). In other words, if the residuals time series is segmented into small contiguous chunks, then any impermanent faults would have resulted in a small/finite number (but not all) of unusual residual chunks. The majority would therefore reflect the long term changes in the monitored system behavior.

This approach therefore greatly enhances the operational quality of machine learning solutions, as well as establishes robust measures to track the performance of active predictive models. This allows the system to create alerts when these models become inadequate as their target system conditions change significantly over time. It will also help keep the machine learning product well-performing and reduces the chances of false results.

System Architecture Overview

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 7:
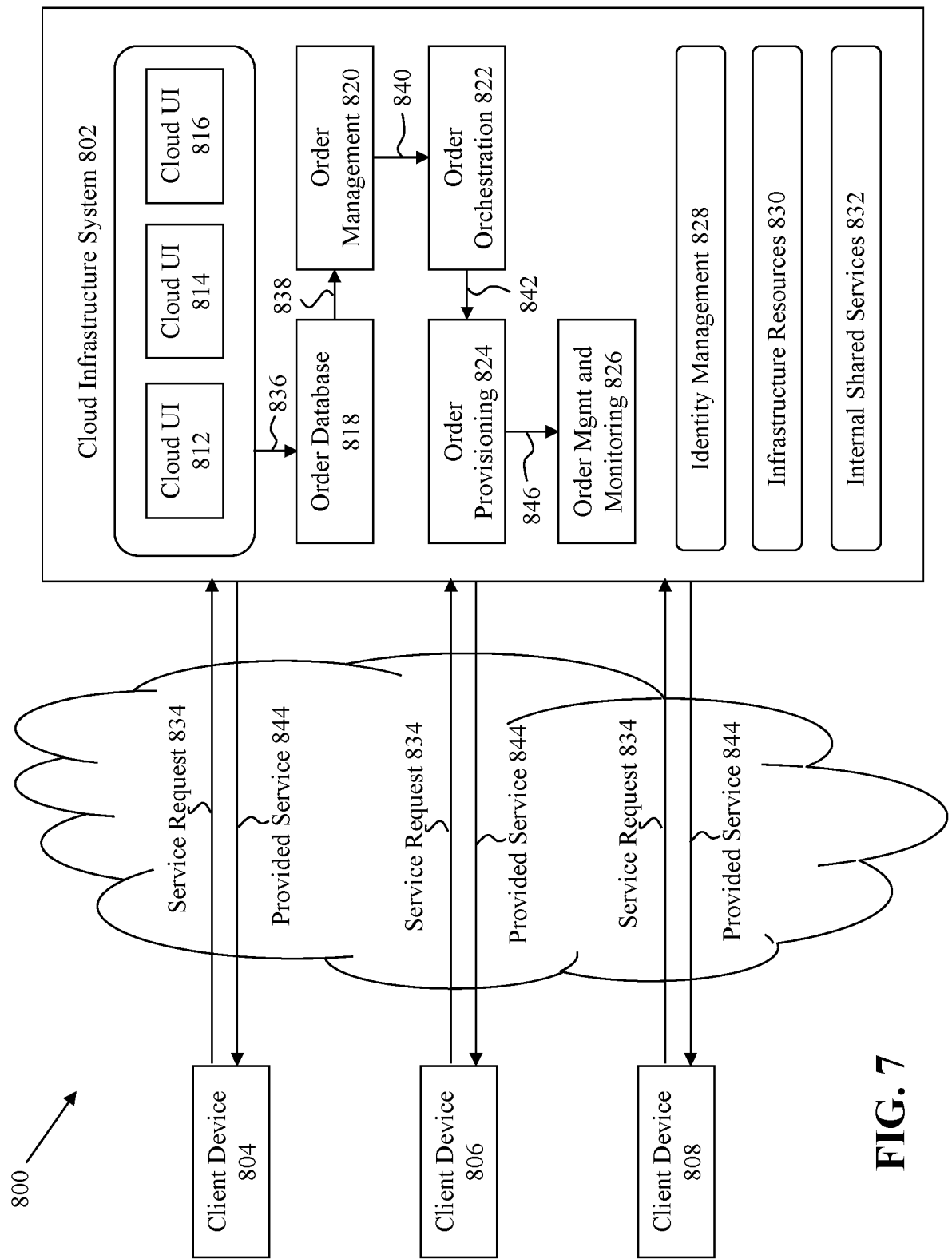
FIG. 7 is a block diagram of one or more components of a system environment by which services provided by one or more components of an embodiment system may be offered as cloud services, in accordance with an embodiment of the present disclosure.

FIG. 7 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 6. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloudservices via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A computer-implemented method for performing context-aware analysis for a machine learning system, comprising:
   collecting component-level data from a monitored target system;
   collecting subcomponent-level data from the monitored target system;
   identifying a fault condition from within the component-level data;

generating a fault diagnosis for the fault condition identified from within the component-level data;
identifying an association rule that corresponds to the fault diagnosis; and
applying, by a processor that executes instructions stored in memory of a computing system, the association rule to correlate the fault diagnosis to one or more subcomponents within the subcomponent-level data.

2. The computer-implemented method of claim 1, wherein the fault condition from within the component-level data is identified by application of one or more predictive models against the component-level data, wherein an observed value is compared against a predicted value for the component-level data.

3. The computer-implemented method of claim 2, wherein a signal within the component-level data corresponds to a signal structure that includes the observed value, the predicted value, and a fault mode that identifies a condition under which the fault condition is identified for comparison of the observed value against the predicted value.

4. The computer-implemented method of claim 1, wherein the subcomponent-level data from the monitored target system are organized into sorted lists on a subcomponent basis for specific data value types, where the sorted lists are analyzed relative to the association rule to identify a victim subcomponent and a culprit subcomponent.

5. The computer-implemented method of claim 1, wherein the fault diagnosis for the fault condition is generated by application of a Bayesian network model against the component-level data corresponding to the fault condition.

6. The computer-implemented method of claim 1, wherein at least one of a victim list or a culprit list is generated that respectively identifies one or more victim subcomponents or one or more culprit subcomponents.

7. The computer-implemented method of claim 1, wherein upon identification of a victim subcomponent or a culprit subcomponent, the victim subcomponent or the culprit subcomponent is handled by at least one of (a) generating an alert; (b) generating an advice for processing the fault diagnosis; or (c) automated correction for the fault diagnosis.

8. The computer-implemented method of claim 1, wherein the component-level data corresponds to data that is used to generate one or more predictive models for a component, and the subcomponent-level data is not used to generate the one or more predictive models for the one or more subcomponents.

9. A system for performing context-aware analysis for a machine learning system, comprising:
a processor; and
a memory for holding programmable code, wherein the programmable code includes instructions for collecting component-level data from a monitored target system; collecting subcomponent-level data from the monitored target system; identifying a fault condition from within the component-level data; generating a fault diagnosis for the fault condition identified from within the component-level data; identifying an association rule that corresponds to the fault diagnosis; and applying, by the processor, the association rule to correlate the fault diagnosis to one or more subcomponents within the subcomponent-level data.

10. The system of claim 9, wherein the fault condition from within the component-level data is identified by application of one or more predictive models against the component-level data, wherein an observed value is compared against a predicted value for the component-level data.

11. The system of claim 10, wherein a signal within the component-level data corresponds to a signal structure that includes the observed value, the predicted value, and a fault mode that identifies a condition under which the fault condition is identified for comparison of the observed value against the predicted value.

12. The system of claim 9, wherein the subcomponent-level data from the monitored target system are organized into sorted lists on a subcomponent basis for specific data value types, where the sorted lists are analyzed relative to the association rule to identify a victim subcomponent and a culprit subcomponent.

13. The system of claim 9, wherein the fault diagnosis for the fault condition is generated by application of a Bayesian network model against the component-level data corresponding to the fault condition.

14. The system of claim 9, wherein at least one of a victim list or a culprit list is generated that respectively identifies one or more victim subcomponents or one or more culprit subcomponents.

15. The system of claim 9, wherein upon identification of a victim subcomponent or a culprit subcomponent, the victim subcomponent or the culprit subcomponent is handled by at least one of (a) generating an alert; (b) generating an advice for processing the fault diagnosis; or (c) automated correction for the fault diagnosis.

16. The system of claim 9, wherein the component-level data corresponds to data that is used to generate one or more predictive models for a component, and the subcomponent-level data is not used to generate the one or more predictive models for the one or more subcomponents.

17. A computer program product embodied on a non-transitory computer readable medium having stored thereon a sequence of instructions which, when executed by a processor, causes the processor to perform context-aware analysis for a machine learning system comprising:
collecting component-level data from a monitored target system;
collecting subcomponent-level data from the monitored target system;
identifying a fault condition from within the component-level data;
generating a fault diagnosis for the fault condition identified from within the component-level data;
identifying an association rule that corresponds to the fault diagnosis; and
applying, by a processor that executes instructions stored in memory of a computing system, the association rule to correlate the fault diagnosis to one or more subcomponents within the subcomponent-level data.

18. The computer program product of claim 17, wherein the fault condition from within the component-level data is identified by application of one or more predictive models against the component-level data, wherein an observed value is compared against a predicted value for the component-level data.

19. The computer program product of claim 18, wherein a signal within the component-level data corresponds to a signal structure that includes the observed value, the predicted value, and a fault mode that identifies a condition under which the fault condition is identified for comparison of the observed value against the predicted value.

20. The computer program product of claim 17, wherein the subcomponent-level data from the monitored target system are organized into sorted lists on a subcomponent basis for specific data value types, where the sorted lists are analyzed relative to the association rule to identify a victim subcomponent and a culprit subcomponent.

21. The computer program product of claim 17, wherein the fault diagnosis for the fault condition is generated by application of a Bayesian network model against the component-level data corresponding to the fault condition.

22. The computer program product of claim 17, wherein at least one of a victim list or a culprit list is generated that respectively identifies one or more victim subcomponents or one or more culprit subcomponents.

23. The computer program product of claim 17, wherein upon identification of a victim subcomponent or a culprit subcomponent, the victim subcomponent or the culprit subcomponent is handled by at least one of (a) generating an alert; (b) generating an advice for processing the fault diagnosis; or (c) automated correction for the fault diagnosis.

24. The computer program product of claim 17, wherein the component-level data corresponds to data that is used to generate one or more predictive models for a component, and the subcomponent-level data is not used to generate the one or more predictive models for the one or more subcomponents.

* * * * *